United States Patent
Kumar et al.

(10) Patent No.: US 9,251,097 B1
(45) Date of Patent: Feb. 2, 2016

(54) REDUNDANT KEY MANAGEMENT

(71) Applicant: Amazon Technologies, Inc., Reno, NV (US)

(72) Inventors: Sandeep Kumar, Issaquah, WA (US); Gregory Branchek Roth, Seattle, WA (US); Gregory Alan Rubin, Seattle, WA (US); Mark Christopher Seigle, Seattle, WA (US); Kamran Tirdad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 13/919,701

(22) Filed: Jun. 17, 2013

(51) Int. Cl.
*G06F 21/00* (2013.01)
*G06F 12/14* (2006.01)
*G06F 11/14* (2006.01)

(52) U.S. Cl.
CPC ........ *G06F 12/1408* (2013.01); *G06F 11/1464* (2013.01)

(58) Field of Classification Search
CPC .................................................. G06F 11/1464
See application file for complete search history.

(56) References Cited

U.S. PATENT DOCUMENTS

| | | | |
|---|---|---|---|
| 5,282,099 A | 1/1994 | Kawagoe et al. | |
| 5,506,809 A | 4/1996 | Csoppenszky et al. | |
| 5,586,291 A | 12/1996 | Lasker et al. | |
| 5,751,997 A | 5/1998 | Kullick et al. | |
| 5,757,617 A | 5/1998 | Sherry | |
| 5,900,007 A | 5/1999 | Nunnelley et al. | |
| 6,023,710 A | 2/2000 | Steiner et al. | |
| 6,138,126 A | 10/2000 | Hitz | |
| 6,234,591 B1 | 5/2001 | Driscoll et al. | |
| 6,578,127 B1 | 6/2003 | Sinclair | |
| 6,604,224 B1 | 8/2003 | Armstrong et al. | |
| 6,606,629 B1 | 8/2003 | DeKoning et al. | |
| 6,768,863 B2 | 7/2004 | Ando et al. | |
| 6,950,967 B1 | 9/2005 | Brunnett et al. | |
| 7,057,981 B2 | 6/2006 | Kano et al. | |
| 7,076,604 B1 | 7/2006 | Thelin | |
| 7,120,737 B1 | 10/2006 | Thelin | |
| 7,200,008 B1 | 4/2007 | Bhugra | |
| 7,269,733 B1 | 9/2007 | O'Toole | |
| 7,359,186 B2 | 4/2008 | Honda et al. | |
| 7,577,689 B1 | 8/2009 | Masinter et al. | |
| 7,587,749 B2 * | 9/2009 | Leser et al. | 726/1 |
| 7,685,309 B2 | 3/2010 | Caronni et al. | |

(Continued)

OTHER PUBLICATIONS

Amazon Web Services, "Amazon Elastic MapReduce Developer Guide," API Version Nov. 30, 2009, dated Jun. 12, 2012, retrieved on Jun. 22, 2015, from https://web.archive.org/web/20120612043953/http://s3.amazonaws.com/awsdocs/ElasticMapReduce/latest/emr-dg.pdf, 318 pages.

(Continued)

*Primary Examiner* — Morshed Mehedi
(74) *Attorney, Agent, or Firm* — Davis Wright Tremaine LLP

(57) ABSTRACT

A data storage service redundantly stores data and keys used to encrypt the data. Data objects are encrypted with first cryptographic keys. The first cryptographic keys are encrypted by second cryptographic keys. The first cryptographic keys and second cryptographic keys are redundantly stored in a data storage system to enable access of the data objects, such as to respond to requests to retrieve the data objects. The second cryptographic keys may be encrypted by third keys and redundantly stored in the event access to a second cryptographic key is lost.

26 Claims, 15 Drawing Sheets

(56) References Cited

U.S. PATENT DOCUMENTS

| | | | |
|---|---|---|---|
| 7,730,071 B2 | 6/2010 | Iwasaki et al. | |
| 7,774,466 B2 | 8/2010 | Coates et al. | |
| 7,814,078 B1 | 10/2010 | Forman et al. | |
| 7,827,201 B1 | 11/2010 | Gordon et al. | |
| 7,840,878 B1 | 11/2010 | Tang et al. | |
| 8,015,158 B1 | 9/2011 | Mankovsky et al. | |
| 8,019,925 B1 | 9/2011 | Vogan et al. | |
| 8,060,473 B1 | 11/2011 | Dhumale et al. | |
| 8,090,104 B2* | 1/2012 | Wajs | 380/239 |
| 8,091,137 B2* | 1/2012 | Karp et al. | 726/26 |
| 8,130,554 B1 | 3/2012 | Linnell | |
| 8,156,381 B2 | 4/2012 | Tamura et al. | |
| 8,191,841 B2 | 6/2012 | Jeffrey et al. | |
| 8,291,170 B1 | 10/2012 | Zhang et al. | |
| 8,331,095 B2 | 12/2012 | Hu et al. | |
| 8,352,439 B1 | 1/2013 | Lee et al. | |
| 8,370,315 B1 | 2/2013 | Efstathopoulos et al. | |
| 8,464,133 B2 | 6/2013 | Grube et al. | |
| 8,595,596 B2 | 11/2013 | Grube et al. | |
| 8,620,870 B2* | 12/2013 | Dwarampudi et al. | G06F 11/1448 707/665 |
| 8,646,061 B2* | 2/2014 | Oh et al. | 726/10 |
| 8,671,076 B2 | 3/2014 | Price et al. | |
| 8,699,159 B1 | 4/2014 | Malina | |
| 8,726,406 B2* | 5/2014 | Catrein et al. | 726/30 |
| 8,781,969 B2* | 7/2014 | Khandelwal et al. | 705/51 |
| 8,826,036 B1* | 9/2014 | Snodgrass et al. | 713/189 |
| 8,935,221 B1* | 1/2015 | Lazier et al. | 707/690 |
| 9,047,306 B1 | 6/2015 | Frolund et al. | |
| 9,053,212 B2* | 6/2015 | Beckey | G06F 17/30997 |
| 2002/0055942 A1 | 5/2002 | Reynolds | |
| 2002/0122203 A1 | 9/2002 | Matsuda | |
| 2002/0186844 A1 | 12/2002 | Levy et al. | |
| 2003/0033308 A1 | 2/2003 | Patel et al. | |
| 2004/0003272 A1 | 1/2004 | Bantz et al. | |
| 2004/0057203 A1 | 3/2004 | Rabinovitz | |
| 2004/0098565 A1 | 5/2004 | Rohlman et al. | |
| 2004/0243737 A1 | 12/2004 | Beardsley et al. | |
| 2005/0057898 A1 | 3/2005 | El-Batal et al. | |
| 2005/0114338 A1 | 5/2005 | Borthakur et al. | |
| 2005/0117462 A1 | 6/2005 | Kano et al. | |
| 2005/0160427 A1 | 7/2005 | Ustaris | |
| 2005/0203976 A1 | 9/2005 | Hyun et al. | |
| 2005/0262378 A1 | 11/2005 | Sleeman et al. | |
| 2005/0267935 A1 | 12/2005 | Gandhi et al. | |
| 2005/0270681 A1 | 12/2005 | Suzuki et al. | |
| 2006/0087760 A1 | 4/2006 | Forrer et al. | |
| 2006/0095741 A1 | 5/2006 | Asher et al. | |
| 2006/0187634 A1 | 8/2006 | Tanaka et al. | |
| 2006/0272023 A1 | 11/2006 | Schmeidler et al. | |
| 2007/0011472 A1 | 1/2007 | Cheng | |
| 2007/0050479 A1 | 3/2007 | Yoneda | |
| 2007/0053169 A1 | 3/2007 | Carlson et al. | |
| 2007/0079087 A1 | 4/2007 | Wang et al. | |
| 2007/0091559 A1 | 4/2007 | Malone | |
| 2007/0101095 A1 | 5/2007 | Gorobets | |
| 2007/0156842 A1 | 7/2007 | Vermeulen et al. | |
| 2007/0174362 A1 | 7/2007 | Pham et al. | |
| 2007/0198789 A1 | 8/2007 | Clark et al. | |
| 2007/0233781 A1 | 10/2007 | Starr et al. | |
| 2008/0059483 A1 | 3/2008 | Williams et al. | |
| 2008/0068899 A1 | 3/2008 | Ogihara et al. | |
| 2008/0099235 A1 | 5/2008 | Hiramoto et al. | |
| 2008/0120164 A1 | 5/2008 | Hassler | |
| 2008/0177697 A1 | 7/2008 | Barsness et al. | |
| 2008/0285366 A1 | 11/2008 | Fujiwara | |
| 2008/0294764 A1 | 11/2008 | Wakako | |
| 2009/0083476 A1 | 3/2009 | Pua et al. | |
| 2009/0144568 A1 | 6/2009 | Fung | |
| 2009/0157700 A1 | 6/2009 | Van Vugt | |
| 2009/0164506 A1 | 6/2009 | Barley et al. | |
| 2009/0213487 A1 | 8/2009 | Luan et al. | |
| 2009/0234883 A1 | 9/2009 | Hurst et al. | |
| 2009/0254572 A1* | 10/2009 | Redlich | G06Q 10/06 |
| 2009/0265568 A1 | 10/2009 | Jackson | |
| 2009/0300403 A1 | 12/2009 | Little | |
| 2010/0037056 A1 | 2/2010 | Follis et al. | |
| 2010/0094819 A1 | 4/2010 | Bornhoevd et al. | |
| 2010/0169544 A1 | 7/2010 | Eom et al. | |
| 2010/0217927 A1 | 8/2010 | Song et al. | |
| 2010/0235409 A1 | 9/2010 | Roy et al. | |
| 2010/0241619 A1* | 9/2010 | Snider et al. | 707/693 |
| 2010/0242096 A1 | 9/2010 | Varadharajan et al. | |
| 2011/0026942 A1 | 2/2011 | Naito | |
| 2011/0035757 A1 | 2/2011 | Corner | |
| 2011/0058277 A1 | 3/2011 | de la Fuente et al. | |
| 2011/0078407 A1 | 3/2011 | Lewis | |
| 2011/0161679 A1 | 6/2011 | Grube et al. | |
| 2011/0185099 A1 | 7/2011 | Stuhlsatz et al. | |
| 2011/0225417 A1 | 9/2011 | Maharajh et al. | |
| 2011/0247074 A1 | 10/2011 | Manring et al. | |
| 2011/0276656 A1 | 11/2011 | Knapp et al. | |
| 2011/0282839 A1 | 11/2011 | Paksoy et al. | |
| 2011/0289383 A1 | 11/2011 | Dhuse et al. | |
| 2012/0079562 A1 | 3/2012 | Anttila et al. | |
| 2012/0137062 A1 | 5/2012 | Arges et al. | |
| 2012/0143830 A1 | 6/2012 | Cormode et al. | |
| 2012/0166576 A1 | 6/2012 | Orsini et al. | |
| 2012/0173392 A1 | 7/2012 | Kirby et al. | |
| 2012/0210092 A1 | 8/2012 | Feldman | |
| 2012/0233432 A1 | 9/2012 | Feldman et al. | |
| 2012/0306912 A1 | 12/2012 | Blanco et al. | |
| 2012/0311260 A1 | 12/2012 | Yamagiwa et al. | |
| 2013/0046974 A1 | 2/2013 | Kamara et al. | |
| 2013/0254166 A1 | 9/2013 | Kottomtharayil | |
| 2013/0290263 A1 | 10/2013 | Beaverson et al. | |
| 2014/0052706 A1 | 2/2014 | Misra et al. | |
| 2014/0068208 A1 | 3/2014 | Feldman | |
| 2014/0149794 A1 | 5/2014 | Shetty et al. | |
| 2014/0161123 A1 | 6/2014 | Starks et al. | |

OTHER PUBLICATIONS

Amazon Web Services, Amazon Glacier Developer Guide, API Version Jun. 1, 2012, dated Aug. 20, 2012, retrieved Jun. 22, 2015, from https://web.archive.org/web/20120908043705/http://awsdocs.s3.amazonaws.com/glacier/latest/glacier-dg.pdf, 209 pages.

Amazon Web Services, "AWS Import/Export Developer Guide," API Version Jun. 3, 2010, dated Jun. 12, 2012, retrieved Jun. 22, 2015, from https://web.archive.org/web/20120612051330/http://s3.amazonaws.com/awsdocs/ImportExpert/latest/AWSImportExport-dg.pdf, 104 pages.

Duan, "Research and Application of Distributed Parallel Search Hadoop Algorithm," 2012 International Conference on Systems and Informatics (ICSAI 2012), IEEE, May 19, 2012, pp. 2462-2465.

Wikipedia, "Process identifier," dated Sep. 3, 2010, retrieved Jul. 9, 2015, from https://en.wikipedia.org/w/index.php?title=Process_identifier&oldid=382695536, 2 pages.

Amer et al., "Design Issues for a Shingled Write Disk System," 26th IEEE Symposium on Massive Storage Systems and Technologies: Research Track (MSST 2010):1-12, May 2010.

Cisco, "Cisco Standalone HDD Firmware Update Version 3.0—IBM Servers," Nov. 16, 2010, 5 pages.

Gibson et al., "Directions for Shingled-Write and Two-Dimensional Magnetic Recording System Architectures: Synergies with Solid-State Disks (CMU-PDL-09-104)," Carnegie Mellon University Research Showcase, Parallel Data Laboratory, Research Centers and Institutes, pp. 1-3, May 1, 2009.

IEEE, "The Authoritative Dictionary of IEEE Standards Terms," Seventh Edition; 2000, p. 836.

International Search Report and Written Opinion mailed Jun. 13, 2012, in International Patent Application No. PCT/US2012/029828, filed Mar. 20, 2012.

International Search Report and Written Opinion mailed Feb. 14, 2014, in International Patent Application No. PCT/US2013/053828, filed Aug. 6, 2013.

International Search Report and Written Opinion mailed Feb. 14, 2014, in International Patent Application No. PCT/US2013/053853, filed Aug. 6, 2013.

(56) References Cited

OTHER PUBLICATIONS

International Search Report and Written Opinion mailed Mar. 6, 2014, in International Patent Application No. PCT/US2013/053852, filed Aug. 6, 2013.

Merriam-Webster, "Predetermine," Current Edition of Dictionary, www.merriam-webster.com/dictionary, retrieved on Dec. 15, 2014.

Micheloni et al., "Inside NAND Flash Memories," Springer First Edition (ISBN 978-90-481-9430-8):40-42, Aug. 2010.

Rosenblum et al., "The Design and Implementation of a Log-Structured File System," University of California at Berkley, ACM Transactions on Computer Systems vol./Issue 10(1):26-52, Feb. 1992.

Wikipedia, "Checksum," from Wayback/Wikipedia at en.wikipedia.org/wiki/checksum, retrieved Mar. 2011, 5 pages.

Wikipedia, "Error Correction," from Wayback/Wikipedia.org at en.wikipedia.org/wiki/Error-correcting_code, retrieved Sep. 2010, 7 pages.

Wikipedia, "Hash Tree," from Wikipedia.org at http://en.wikipedia.org/wiki/Hash_tree, retrieved Jul. 12, 2012, 1 page.

Yu et al., "Exploiting sequential access when declustering data over disks and MEMS-based storage," Distributed and Parallel Databases vol./Issue 19(2-3):147-168, May 2006.

Seagate, "Firmware Updates for Seagate Products," Author Unknown, published Feb. 2012 at http://knowledge.seagate.com/articles/en US/FAQ/207931en.

Roos, "How to Leverage an API for Conferencing," Dave Roos, published Jan. 2012, at http://money.howstuffworks.com/businesscommunications/ how-to-leverage-an-api-for-conferencing1.htm.

Jacobs et al., "Memory Systems, Cache, DRAM, Disk," Copyright 2007, Morgan Kaufman, 9 pages.

* cited by examiner

1200

| Serial | Key |
|---|---|
| 1 | $\{KEK_1\}_{DRPK}$ |
| 2 | $\{KEK_2\}_{DRPK}$ |
| 3 | $\{KEK_3\}_{DRPK}$ |
| 4 | $\{KEK_4\}_{DRPK}$ |
| ⋮ | ⋮ |

FIG. 12

REDUNDANT KEY MANAGEMENT

CROSS-REFERENCE TO RELATED APPLICATIONS

This application incorporates by reference for all purposes the full disclosure of U.S. patent application Ser. No. 13/569,994, filed on Aug. 8, 2012, entitled "ARCHIVAL DATA IDENTIFICATION," U.S. patent application Ser. No. 13/570,088, filed on Aug. 8, 2012, entitled "ARCHIVAL DATA STORAGE SYSTEM," U.S. patent application Ser. No. 13/570,092, filed on Aug. 8, 2012, entitled "ARCHIVAL DATA FLOW MANAGEMENT," and U.S. patent application Ser. No. 13/069,065, filed on Mar. 22, 2011 entitled "MODULAR MASS STORAGE SYSTEM."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. Organizations may utilize complex data storage systems to efficiently and cost effectively store data. In many instances, organizations configure and utilize data storage systems hosted and managed by other organizations, thereby reducing infrastructure costs and achieving other advantages. With such complex use of computing resources to manage, ensuring that access to the data is authorized and generally that the data is secure can be challenging, especially as the size and complexity of such configurations grow.

BRIEF DESCRIPTION OF THE DRAWINGS

Various embodiments in accordance with the present disclosure will be described with reference to the drawings, in which:

FIG. 12 shows an illustrative representation of a disaster recovery file and data that may be stored therein in accordance with at least one embodiment;

DETAILED DESCRIPTION

Figure 1:
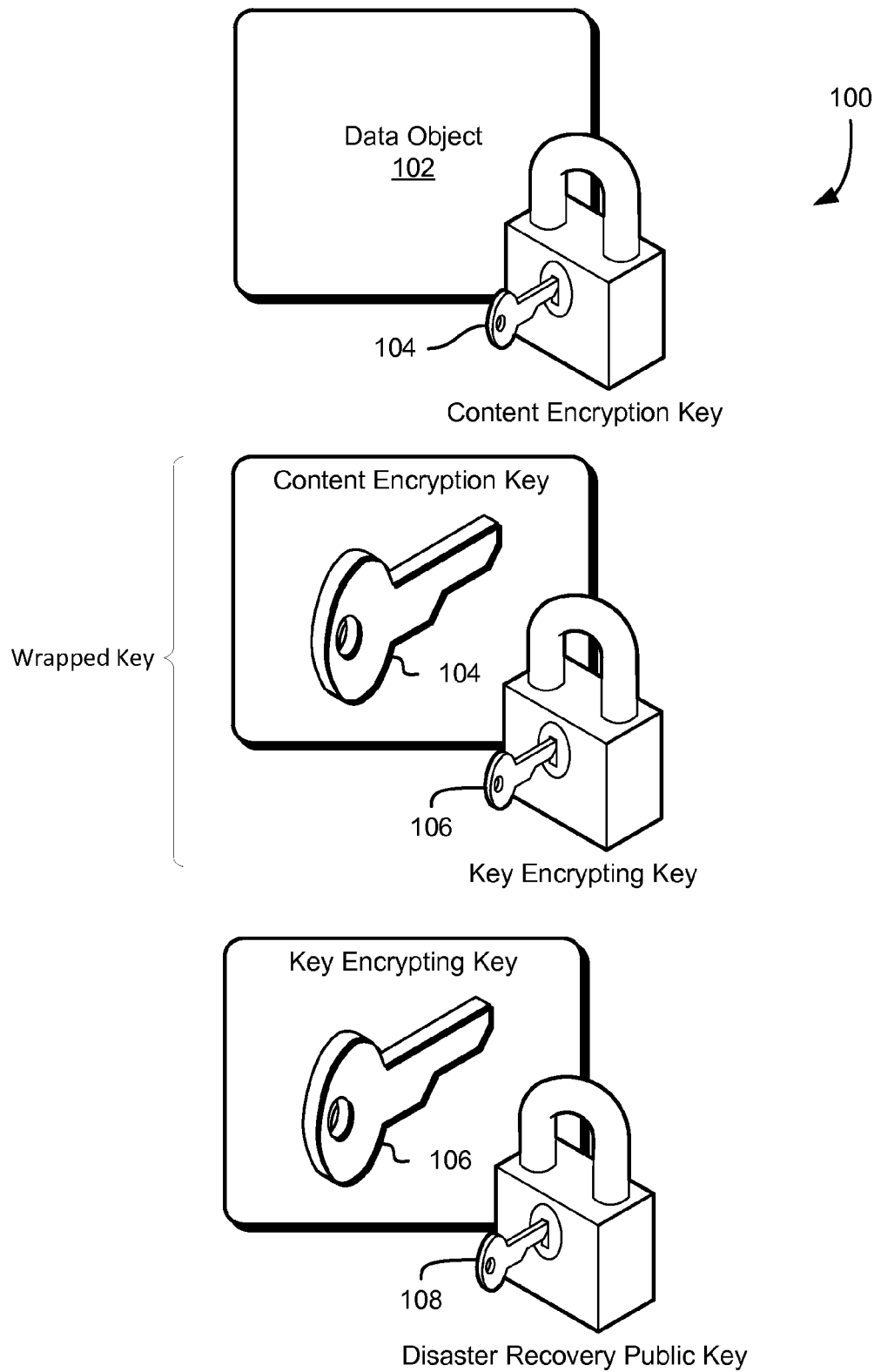
FIG. 1 shows in illustrative diagram of cryptographic keys and data encrypted under the cryptographic keys in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for enhancing data security in a data storage system. In various embodiments, a data storage system stores data objects on behalf of users of the data storage system. In some examples, the data storage system is hosted and operated by a computing resource service provider as a service for the users, which may be devices of the data storage system. The customers may upload data objects to the data storage system for storage by the data storage system. In some embodiments, the data storage system provides a web service application programming interface (API) and the customers remotely manage their data through the API. For instance, the customers may submit web service calls to upload data to the data storage system, to retrieve data from the data storage system and to perform other operations, to obtain an inventory of data objects stored by the data storage system, and to perform other operations, some of which are described in more detail below.

In various embodiments, a data storage system is operated in a manner providing for data durability and security. For example, in various embodiments, the data storage system redundantly stores, among data storage devices of the data storage system, and also encrypts the data objects. Redundant storage of the data objects may be accomplished in a variety of ways. For instance, in some examples, a redundancy encoding scheme is used to deconstruct a data object into shards, which may be data objects that individually are insufficient for reconstructing the data object but that can be combined with other shards to construct the data object. In some examples, a proper subset of the shards generated from a data object is sufficient for constructing the data object. An example technique for redundantly encoding a data object into shards and reconstructing shards into the data object is erasure coding. The shards may be stored among a set of data storage devices such as by storing a shard in some or all of the data storage devices, with each shard stored in a different data storage device.

For the purpose of data security, the data objects stored by a data storage system may be encrypted using one or more cryptographically strong algorithms, such as algorithms that encrypt data in a manner rendering the encrypted data computationally impractical to decrypt without access to a secret key usable to decrypt the data. Example cryptographic algorithms are discussed below. In various embodiments, a new key, referred to as a content encryption key, is generated for each data object to be stored by the data storage system. The content encryption key may be generated to be unique for the corresponding data object or, generally, such that the probability of multiple data objects sharing the same key is below some threshold. Once generated, the content encryption key is used to encrypt the data object, such as by encrypting the data object before it is deconstructed to shards or by encrypting the shards individually using the key.

To enable future access to the data object, content encryption keys may be persistently stored by the data storage service. However, to protect against unauthorized access to a content encryption key enabling unauthorized decryption of the data object, the data storage service may store content encryption keys in encrypted form. The data storage service may cause the content encrypting keys to be encrypted using key encrypting keys, such as by encrypting the content encrypting keys itself or securely providing the content encrypting keys to another entity to perform the encryption. The key encrypting keys may be securely stored by the data storage service (or another entity) and a single key encrypting key may be used to encrypt multiple content encryption keys. The data storage service or other entity may maintain, in association with data objects, metadata that includes or references the encrypted content encryption keys (referred to as wrapped keys) such that the metadata can be used to access the wrapped keys. The metadata may also associate, directly or indirectly, the wrapped keys with an identifier or other information usable to identify and access the key encrypting key that was used to encrypt the content encryption key encrypted in the wrapped key. In this manner, should future access to the plaintext data of the data object, the identifier can be used to access the proper key encrypting key so that the key encrypting key can be used to decrypt the wrapped key to obtain the content encryption key and, therefore, so that the content encryption key can be used to decrypt the data object.

To further ensure the security of the data, key encrypting keys are, in various embodiments, encrypted under a disaster recovery key. A disaster recovery key may be a public key of a public-private key pair of a public key cryptosystem, whereas, in various embodiments, the content encryption key and key encrypting keys are keys of a symmetric key cryptosystem (a system that utilizes a corresponding cryptographic algorithm, which may be a cryptographic primitive). In this manner, more common operations performed by the data storage system, such as encryption and decryption of data objects and content encryption keys, can be performed computationally efficiently relative to use of public key cryptosystems. In some embodiments, however, the content encryption key and/or key encrypting key is/are public keys used in a public key cryptosystem and/or the disaster recovery key is a key of a symmetric key cryptosystem. In embodiments where the disaster recovery key is a public key of a public key cryptosystem, the private key corresponding to the disaster recovery key is stored in a highly secure manner, which may utilize specialized hardware and which may require specific security protocols to be followed in order to access (use) the private key for the performance of cryptographic operations.

A single disaster recovery key may be used to encrypt one or more key encrypting keys, which may be rotated over time for the purpose of security. Key encrypting keys may be encrypted by the disaster recovery key and (in encrypted form) stored in a file, referred to as a disaster recovery file, that is redundantly stored in the data storage system. For example, the disaster recovery file may be stored in multiple data storage devices (e.g., drives) that also store the data objects (perhaps in shard form). In some embodiments, every data storage device of the data storage system that stores a shard also stores the disaster recovery file. The disaster recovery file may also associate key encrypting keys with identifiers of the key encrypting keys. In this manner, should access to a key encrypting key be lost, the disaster recovery file can be used to decrypt the key encrypting key from the disaster recovery file.

In various embodiments, the data storage service operates in accordance with a service-level agreement (SLA) relating to durability of the data stored therein, where durability is a measurement of likelihood that a data object stored by the data storage system will not become inadvertently inaccessible due to various factors, such as drive malfunction, catastrophic events and/or other events that can cause some data to be lost. Further, in various embodiments, cryptographic keys are persisted to ensure durability of the keys that is greater than to that of the SLA. For example, content encryption keys may be stored with at least as good a durability as the data objects with which they correspond. Likewise, key encrypting keys may be stored with a durability that is greater than the durability of the SLA. Generally, the content encryption keys and key encrypting keys may be stored such that, when their durability is taken into account when calculating the durability of the data objects stored by the data storage system, the SLA is not violated. In other words, the durability of the cryptographic keys used by a data storage system is used in determining the durability of the data objects to ensure compliance with the SLA. In this manner, the SLA is not inadvertently violated due to a lack of durability of the keys.

FIG. 1 shows an illustrative example of a diagram 100 illustrating various aspects of the present disclosure. In particular, FIG. 1 shows a variety of keys that may be used by a data storage system in order to securely store data. For example, as illustrated in FIG. 1, a data object 102 is encrypted under a content encryption key 104. In other words, data of the data object 102 may be encrypted using a cryptographic cipher that uses the content encryption key 104 as input. The data object 102 may be an object of data (such as a sequence of bits) stored by a data storage system, such as described above and below. The data storage system may be configured with the ability to store data objects of varying sizes. In some examples, users of the data storage service can utilize the data storage service to store objects of any size except for limits set by or inherent to the data storage service. In some embodiments, the content encryption key 104 is a symmetric key of a private key cryptosystem, also known as symmetric key algorithms. In various embodiments of the present disclosure, each data object 102 is encrypted with a corresponding content encryption key 104, which may be unique to the data object. Accordingly, a new content encryption key 104 may be generated for each data object to be stored.

In various embodiments of the present disclosure, content encryption keys are stored by the data storage system so that the content encryption keys are accessible for the decryption of data. However, to avoid an unauthorized access of data, the content encryption keys 104 may be stored in encrypted form. As illustrated in FIG. 1, content encryption keys 104 are themselves encrypted under a key encrypting key 106. A content encryption key 104 encrypted under a key encrypting key 106 may be referred to as a key wrapped key. In various embodiments, the key encrypting key 106 is also a symmetric key used in a symmetric key cryptosystem, which may be but is not necessarily the same symmetric key cryptosystem utilized to encrypt the data object 102.

As discussed in more detail below, a data storage system may encrypt content encryption keys 104 for storage within the data storage system. The same key encrypting key 106 may be used to encrypt multiple content encryption keys. However, to enhance security by, for instance, avoiding cryptographic attacks performable when a key is used repeatedly, the key encrypting key 106 may be rotated. Rotating a key encrypting key may be performed by generating or otherwise obtaining a new key encrypting key and using the new key encrypting key to perform encryption (and, if appropriate, decryption) of content encryption keys 104. When a key encrypting key is replaced by a new key encrypting key, it may be said that the key encrypting key that was replaced has been retired. The data storage system may securely store retired key encrypting keys so as to maintain the ability to access content encryption keys that were encrypted under the key encrypting keys before their retirement. Thus, for instance, if a user requests to access a data object (e.g., requests that the data object be retrieved from one or more data storage devices of the data storage system and provided), data storage system may access an appropriate retired key encrypting key, if the key encrypting key has been retired before the request has been received, and use the retired key encrypting key to decrypt a content encryption key used to encrypt the data object. The decrypted content encryption key may then be used to decrypt the data object so that the data object can be provided to the user in a form usable to the user, such as plaintext form or encrypted form decryptable by the user (e.g., over a secure socket layer (SSL) connection).

Various embodiments of the present disclosure utilize techniques to further enhance security by redundantly storing key encrypting keys in encrypted form in the data storage system. In an embodiment, a disaster recovery public key 108 is used to encrypt a key encrypting key used by the data storage system. The disaster recovery public key 108 may be a public key of a public key cryptosystem. Described briefly, the public key cryptosystem may be utilized to enable any entity with access to the public key (which may be publically available) to encrypt data using the disaster recovery public key. Decryption of the encrypted data may be performed by any holder of a disaster recovery private key corresponding to the disaster recovery public key. Sample symmetric cryptosystems include, but are not limited to, the ElGamal cryptosystem, elliptic curve cryptosystems, the Pallier cryptosystem, the Ron Rivest, Adi Shamir and Leonard Adleman (RSA) cryptosystem, the Cramer-Shoup cryptosystem, and variations thereof.

The disaster recovery private key may be maintained in a secure manner such as in a hardware security module. Further, one or more security procedures may be enforced in connection with access to the disaster recovery private key. For instance, one or more rules with respect to a quorum of operators necessary to be present for access of the disaster recovery private key, may be enforced. In this manner, if a key encrypting key in plaintext form is lost—that is, if the key encrypting key 106 in plaintext form has become accessible, the key encrypting key 106 may be recovered by accessing the key encrypting key 106 in encrypted form and utilizing a disaster recovery private key to decrypt the encrypted key encrypting key 106.

Figure 2:
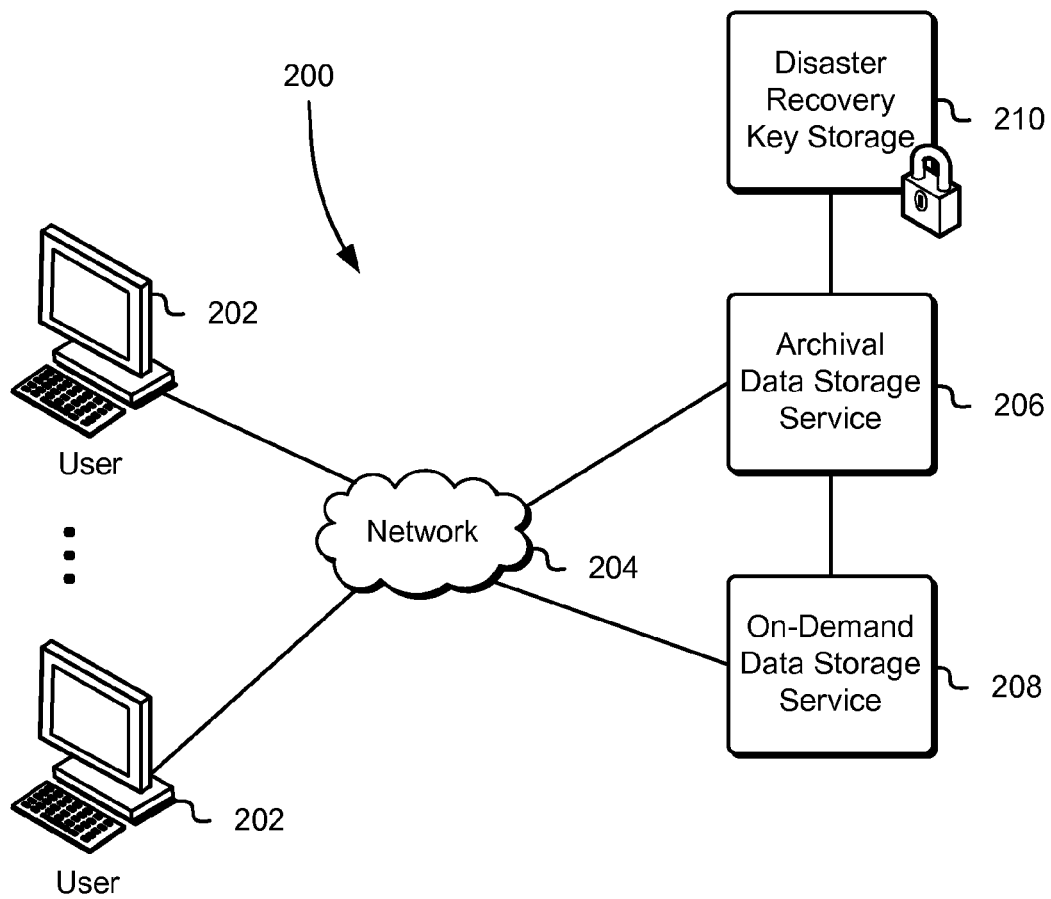
FIG. 2 shows an illustrative example of an environment in which various embodiments can be implemented.

As discussed above, various embodiments of the present disclosure are utilized to enhance data security within a data storage system. FIG. 2 shows an illustrative example of an environment 200 in which various embodiments may be practiced. As illustrated in FIG. 2, the environment 200 may include a plurality of users 202. As discussed below, the users may be computing devices operable to access various computing services over a network 204, which may be the Internet or any suitable communications network or combination of communication networks. Users 202 may be operated in accordance with human operator instructions through appropriate input devices such as keyboards, mice, touch pads, touch screens, and the like, and/or may be operated in accordance with automated processes being executed on by the users 202 or other devices that transmit instructions to the users 202.

In the illustrative example of FIG. 2, the environment 200 includes various services. In this particular example, two services are shown, although various environments in accordance with the present disclosure may utilize more than two services or less than two services. In this example, the environment 200 includes an archival data storage service 206 and an on-demand data storage service 208. The archival data storage service 206 and on-demand data storage service 208 may be configured to operate in different ways in order to achieve various advantages. For instance, the archival data storage service 206 may be configured to store data in a manner that reduces the costs of storage at the expense of performance in connection with data access. As one illustrative example, the archival data storage service may be configured to perform data operations (i.e., store and retrieve data) asynchronously to take advantage of cost savings afforded by batch processing and parallelism. A client of the archival data storage service 206 may receive requests to access data objects stored in the archival storage service, aggregate the requests, process the requests in batches and make the requested data available for retrieval using additional requests. Due to the asynchronous processing, the archival data storage service 206 may require another request to retrieve a data object once the data object has been made ready for retrieval, such as by reading the data object from one or more archival data storage devices and writing the data to one or more staging data storage devices from which the data object is available.

The on-demand data storage service 208, on the other hand, may be configured to provide better performance with respect to data access. For example, the on-demand data storage service 208 may be configured to synchronously process requests to store and/or access data. To enable better performance relative to the archival data storage service 206, the on-demand data storage service 208 may operate using additional computing resources (e.g., databases) that enable the on-demand data storage service 208 to locate and retrieve data quickly relative to the archival data storage service 206. The on-demand data storage service 208 may provide synchronous data access. For example, the on-demand data storage service may maintain stored data in a manner such that, when a request for a data object is retrieved, the data object can be provided (or streaming of the data object can be initiated) in a response to the request.

As illustrated in FIG. 2, the environment 200 also includes disaster recovery key storage system 210. Disaster recovery key storage system 210 may comprise a computer system operable to securely store, in data storage, one or more keys useable to obtain access to key encrypting keys in plaintext form. The disaster recovery key storage system 210 may include, for example, one or more hardware security modules and/or other computing devices which utilize various security measures to avoid unauthorized access. One or more security protocols, such as protocols that ensure that one or more rules for a quorum of human operators are authenticated, may be enforced by the disaster recovery key storage system 210. It should be noted that while illustrated separately from the archival data storage service 206 and the on-demand data storage service 208, a disaster recovery key storage system 210 may be components of one or both of those services.

Figure 3:
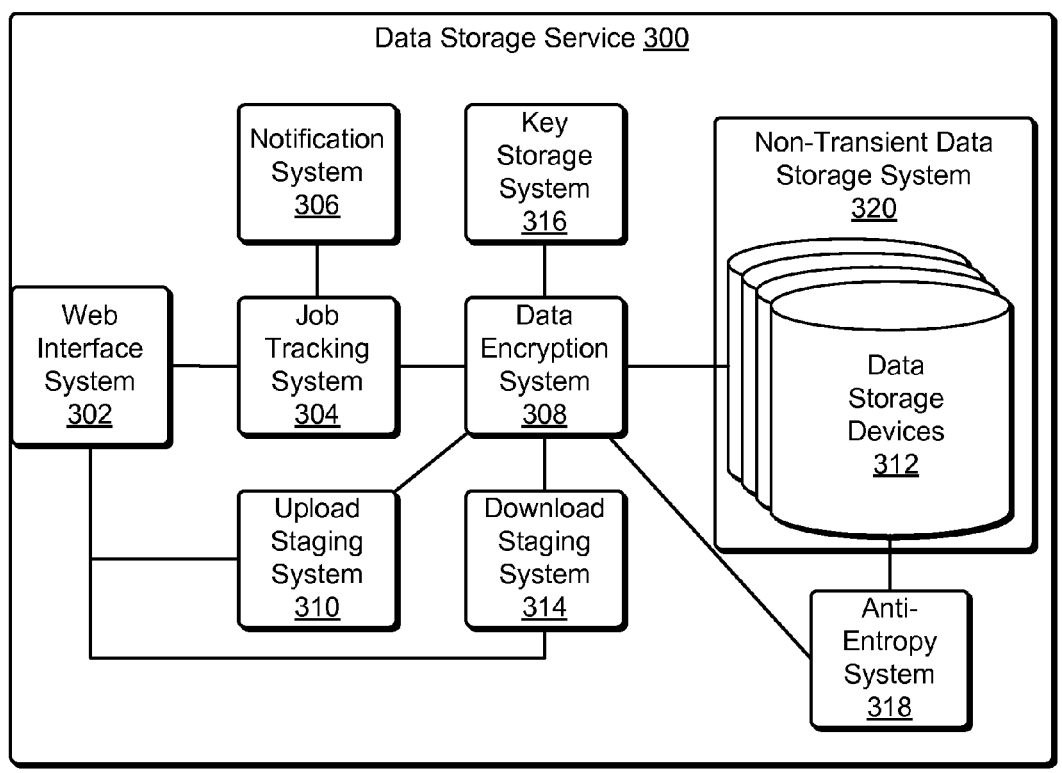
FIG. 3 shows an illustrative example of a data storage service in accordance with at least one embodiment.

FIG. 3 shows an illustrative example of a data storage service 300. The data storage service 300 may be for example the archival data storage service 206 described above in connection with FIG. 2. That is, the data storage service 300 may be for example an archival data storage configured to archive data on behalf of one or more users such as customers of a computing resource service provider. As illustrated in FIG. 3, the data storage service 300 includes, in various embodiments, multiple subsystems which enable the services' operations. For example, in an embodiment, the data storage service 300 includes a web interface system 302, which may be a system comprising one or more web servers to which requests to the data storage service 300 may be submitted by users of the data storage service 300. Generally, the web interface system 302 may be any system configured to receive appropriately configured application programming interface (API) calls to the data storage service 300 for the purpose of causing the data storage service 300 to perform one or more operations in accordance with received API calls.

In various embodiments, the data storage service 300 performs one or more operations asynchronously, such as described above. For example, for some requests submitted to the web interface system 302, the data storage service 300 may provide results of fulfillment of the requests separately from responses to the requests. As an illustrative example, the data storage service 300 may receive to the web interface system 302 a request to retrieve a data storage object stored by the data storage service 300. The data storage service 300 may respond to the request with a response that does not include the requested data, but that may include other information such as information acknowledging the request had been submitted and/or information indicating that the request is to be processed by the data storage service 300. Example information, such as a job identifier, is described below. In these examples, once the data storage service 300 has made the requested data available, the data storage service 300 may provide the data such as in response to a separate request for the data.

As noted above, fulfillment of some types of requests by the data storage service 300 is performed asynchronously. In order to accomplish this, the data storage service 300 may include a job tracking system 304. The job tracking system 304 may be a computer system configured to perform various operations in connection with the tracking of fulfillment of certain types of requests to the data storage service 300 and, in particular, for requests that are fulfilled by the data storage service 300 asynchronously. As an example, when the data storage service 300 receives a request to the web interface system 302, if the request is of a type that is fulfilled asynchronously, the web interface system 302 may notify the job tracking system 304 of the request. Notification may be performed using an electronic communication over an internal network of the data storage service 300 from the web interface system 302 to the job tracking systems 304. The job tracking system 304 may generate an identifier for a job, which may be a workflow for processing the request. The identifier may be generated, for example, in a serial manner or in another manner. The job tracking system 304 may interact with one or more other components of the data storage service 300 in order to track fulfillment of requests for which the job tracking system 304 has initiated jobs.

When the job tracking system 304 detects completion of a job (e.g., detects completion of a workflow to obtain data and make the obtained data available for download), the job tracking system 304 may transmit an electronic message to a notification system 306 which may be a system configured to provide notifications of job completion to users of the data storage service. The notifications may be provided in any suitable manner such as by electronic communications to one or more specified recipients. The notification system 306 may also be configured that users of the data storage service 300 can subscribe to various notification topics and when a message is published to a topic to which a user has been subscribed the user may receive an electronic communication of the message. In this manner, for example, a customer may determine when a job has been completed and results of the job's completion, that is of a corresponding requests fulfillment, are available. In the example of a data retrieval job, for example, a user of the data storage service 300 may utilize a message from the notification system 306 to determine that data requested is available for download. The user may then submit a request to download the data that has been made available. It should be noted that one or more users that receive notifications are not necessarily, but can be, the same user that submitted a request to the web interface system 302 for which a corresponding job was created. Further, in various embodiments, a user that obtains from the data storage service 300 the results of a job may be, but is not necessarily, the same user that initially submitted to the data storage service 300 the request that caused the job to be practiced. For example, one user may request that data be made available for retrieval and another user may request and receive the data once the data has been made available.

As illustrated in FIG. 3, the data storage service 300 includes a data encryption system 308. The data encryption system 308 may be a computer system configured to coordinate the flow of data through various components of the data storage service 300, encrypting and/or decrypting data as appropriate, in order to enable processing of various workflows for processing requests submitted to the data storage service 300. For instance, when a request is submitted to the data storage service 300 to the web interface system 302 to upload a data object to the data storage service 300, the web interface system 302 may obtain the data object from the user that submitted the request and provide the data object to an upload staging system 310 which is an example of a transient (intermediate) data storage system that is configured to store data objects until the stored data objects are moved to longer term archival storage, illustrated FIG. 3 as a non-transient (persistent) data storage system 320 comprising data storage devices 312. In particular, the upload staging system 310, an example of a transient data store, may hold uploaded data objects until the data encryption system 308 retrieves the data objects from the upload staging system 310, encrypts the data objects and transmits the encrypted data objects to the data storage devices 312 of the non-transient data storage system 320 for archival storage.

Similarly, the data storage service 300 may include a download staging system 314 which may be a computer system configured to store data objects until the data objects are retrieved by users of the data storage service 300. For example, when the data storage service 300 receives a request to the web interface system 302 to retrieve a data object that is stored in the data storage device 312, the data encryption system 308 may obtain encrypted data objects from the data storage devices 312, may decrypt the encrypted data objects and transmit the decrypted data objects to the download staging system 314. The user or another user may transmit a subsequent request to the web interface system 302 to download the data object from the download staging system 314.

The download staging system 314 may then provide the data object to the web interface system 302 which then provides the data object to the user that requested the data object. It should be noted that once decrypted by the data encryption system 308 transmission of the data object does not necessarily occur with the data object in plaintext form. For example, data object may be re-encrypted for transmission over an SSL or other secure connection one or more times during the transmission of the data object to the user that requested the data object. In order to perform various encryption and decryption operations, the data encryption system 308 may operate in accordance with a key storage system 316 which is a system configured to store keys utilized by the data encryption system 308, such as described in more detail below.

In addition to the above components, the data storage service 300 may include an anti-entropy system 318. The anti-entropy system 318 may be a system configured to perform various anti-entropy operations in connection with the data storage system. Such operations may include, for example, reclaiming data storage space when the space is no longer needed to store data that was stored in the storage space. The anti-entropy system may also perform various operations to optimize storage efficiency and cost, such as rewriting data more efficiently. As discussed below, the anti-entropy system may, in various circumstances, be configured to encrypt content encryption keys stored by the data storage system. For instance, if a key encrypting key is compromised, the anti-entropy system may locate content encryption keys encrypted under the key encrypting key and encrypt the located keys using a new key encrypting key. The anti-entropy system 318 may operate in a manner that avoids interference with other operations of the data storage service 300, such as read and write operations performed as part of storing and retrieving data objects in/from the data storage service 300. For instance, the anti-entropy system 318 may begin and pause operations to avoid interference.

Figure 4:
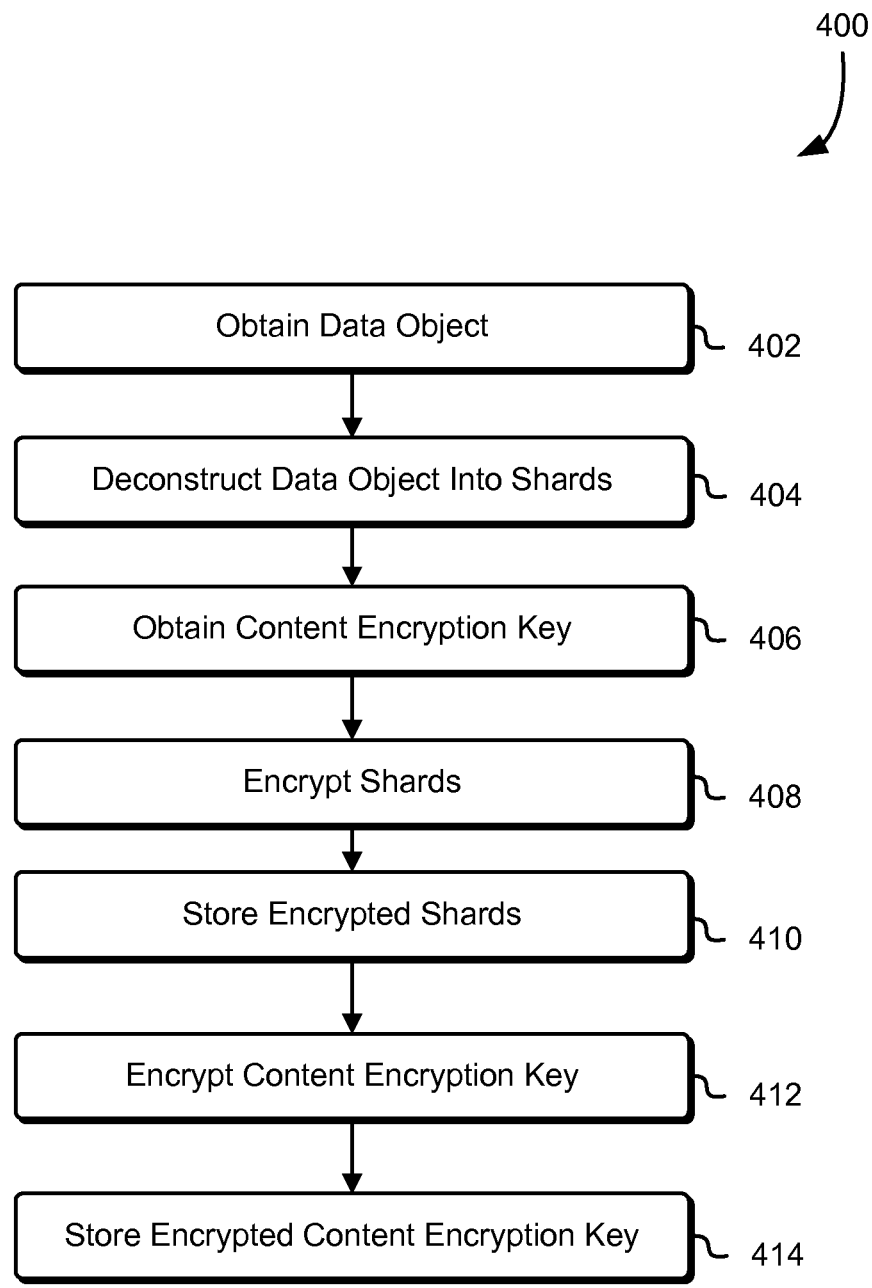
FIG. 4 shows an illustrative example of a process for storing data in accordance with at least one embodiment.

As noted above, various storage systems may utilize various techniques described herein in order to securely store data objects within. FIG. 4 accordingly shows an illustrative example of a process 400 which may be used to securely store data objects in accordance with various embodiments. The process 400 may be performed by any suitable system, such as the data storage service 300 described above in connection with FIG. 3. In an embodiment, the process 400 includes obtaining 402 a data object. The data object may be obtained 402 in various ways in accordance with various embodiments, for example, referring to FIG. 2, the data object may be received from a user 202 of the archival data storage service 206, where the user 202 provided the object to archive the data object. It should be noted that a system performing the process 400 does not necessarily need to receive the data object directly from the user, but may receive the data object from one or more intermediary devices such as a web server, other device or from another service, such as an on-demand data storage service, such as described above.

Returning to FIG. 4, once the data object has been obtained for 402 the process 400 may include deconstructing 404 the data object into shards. A shard may be a collection of data that lacks enough information for constructing the data object, but that, in connection with one or more other shards, can be used to construct the data object. In other words, the shard may individually lack enough data for constructing the data object until combined with one or more other shards. As an example, erasure encoding techniques may be used to deconstruct a data object into N shards, K of which are needed to reconstruct the data object, where N and K are positive integers where K is less than or equal to N. As such, a shard may contain more than its proportional share of data (i.e., more than the size of the data object divided by N), but less data than the data object itself. Further, to retrieve a data object, a data storage system may (e.g., when K is less than N) retrieve less than N shards to construct the data object.

In an embodiment, the process 400 includes obtaining 406 a content encryption key. Obtaining 406 the content encryption key may be performed in any suitable manner. For example, obtaining the content encryption key may be performed by generating the content encryption key. The content encryption key may be generated in any suitable manner, such as by using the SecureRandom class of the Java security package, although other methods of generating keys may be used. For instance, any cryptographically secure key derivation function may be used. Once the content encryption key has been obtained, the process 400 may include encrypting 408 the shards using the content encryption key that was obtained 406. The shards may be encrypted in any suitable manner using any suitable cryptographic algorithm. For example, in some embodiments, the shards are encrypted using the counter mode of the Advanced Encryption Standard (AES-CTR). Generally, the shards may be encrypted by inputting the content encryption key and the shard (for each shard) into a cryptographic algorithm. It should be noted that, while the present disclosure discusses encrypting shards, variations are considered as being within the scope of the present disclosure. For example, in some embodiments, the data object is first encrypted and the shards may be generated from the encrypted data object. Other variations, such as encrypting a data object, generating shards from the encrypted data object, and then encrypting the shards, are also within the scope of the present disclosure. Regardless of how the shards are encrypted, the encrypted shards may then be stored 410 such as in the data storage devices 312 discussed above in connection with FIG. 3. The encrypted shards may be stored in association with additional data, such as metadata described below. The metadata may be stored with the shards or otherwise in association.

The content encryption key used to encrypt 408 the shards may be encrypted 412. The content encryption key may, for instance, be encrypted under a key encrypting key described above. The content encryption key may be encrypted using any suitable cryptographic algorithm such as the Galois counter mode of the Advanced Encryption Standard (AES-GCM). The encrypted content encryption key (i.e., wrapped key) may then be stored 414 so as to be assessable to be decrypted and used to decrypt the encrypted shards. The encrypted content encryption key may, for instance, be stored in metadata stored for the data object, such as described below. It should be noted that, while various embodiments of the present disclosure use AES-CTR and AES-GCM, other cryptographic ciphers may be used. Examples of include, for example, other modes of the Advanced Encryption Standard (AES), Blowfish, Data Encryption Standard (DES), Triple DES, Serpent or Twofish, and depending on the specific implementation selected, may be either asymmetric or symmetric key systems.

Figure 5:
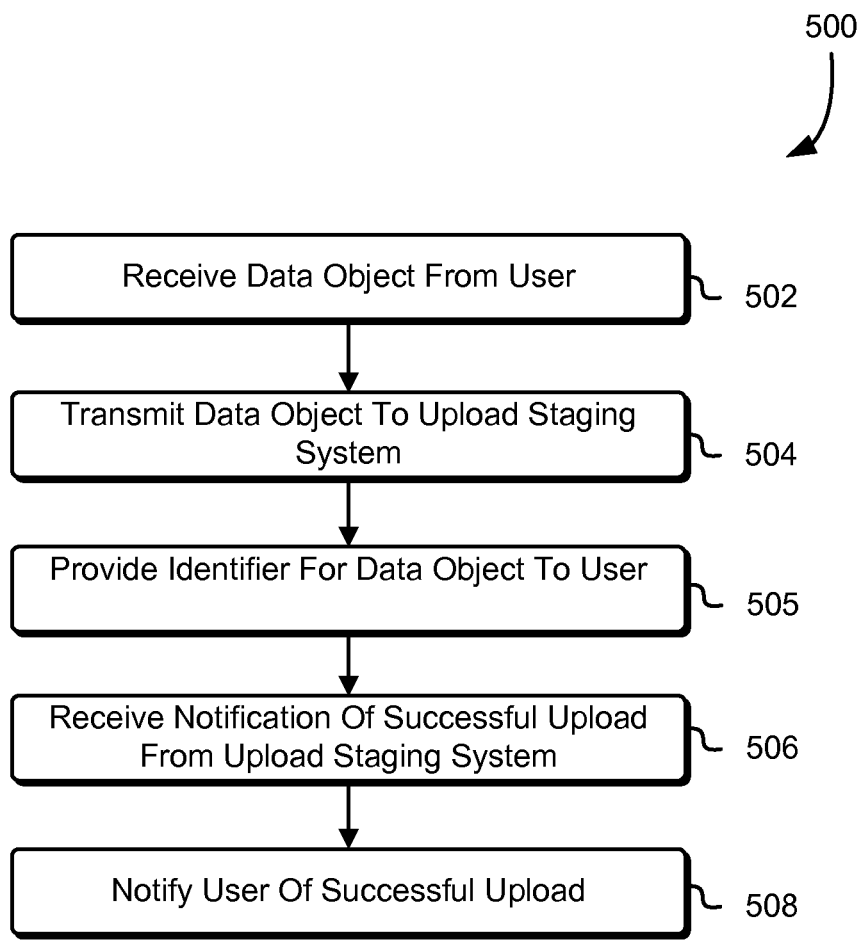
FIG. 5 shows an illustrative example of obtaining data for storage in accordance with at least one embodiment.

Data storage systems typically provide the ability to retrieve data stored therein. FIG. 5, accordingly, shows an illustrative example of a process 500 which may be used to receive data for storage in a data storage system by a user of the data storage system. The process 500 may be performed by any suitable system, such as a data storage system or appropriate component thereof, such as the web interface system 302 described above in connection with FIG. 3.

In an embodiment, the process 500 includes receiving 502 a data object from a user. The user may, for instance, submit an appropriately configured API call to the web interface system 302 of FIG. 3 to upload the data object to the data storage service 300. Returning to FIG. 5, the process 500 includes transmitting 504 the data object to an upload staging system such as described above in connection with FIG. 3. It should be noted that receiving 502 the data object and transmitting 504 the data object to the upload staging system may be performed in various ways in accordance with various embodiments. For instance, a web server may receive the data object and once received, transmit the data object to the upload staging system. A web server may also stream the data object to the upload staging system after the data object is received or during receipt of the data object from the user. Generally, it should be understood that unless explicitly contradicted or otherwise clear from context, the movement of data from one system to another can be performed in any suitable manner, such as in a single transmission, by streaming (i.e. by transmitting the data in pieces over multiple transmissions), or otherwise.

Upon transmission of the data object to the upload staging system, the process 500 of FIG. 5 may include receiving 506 notification of a successful upload from the upload staging system. The upload staging system may, for example, provide an acknowledgement to the web interface system 302 that the complete data object has been received. The upload staging system may provide the acknowledgment upon a successful check to ensure that the data object has been received correctly, such as by using one or more digest computations (e.g., by inputting the data object into a hashing algorithm) for comparison with digest computations made by the web interface system 302 before transmission. Once a system performing the process 500 has received 506 notification of the successful upload from the upload staging system, the process 500 may include notifying 508 the user of the successful upload.

In various embodiments, notification of the successful upload to the user may comprise an electronic message that includes an identifier of the data object used by the data storage service, where the identifier may be useable by the user to later obtain the data object from the data storage service. The user may, for instance, request retrieval of a data object identified by the identifier specified by the user. In some instances, the data storage service opaquely encodes information in the identifier that enables the data storage service to locate, in the data storage system, the data of the data object without having to maintain a separate synchronously accessible database for this purpose.

The identifier of the data object may encode storage location information that may be used to locate a data object stored in an archival data storage system. For example, the storage location information may encode a reference to a hierarchical data structure in which the data object is stored. Such an embodiment may reduce or eliminate the cost to store a namespace map or similar data structure to map data object identifiers to storage locations of the corresponding data objects. The identifier of the data object may also include other information, such as payload validation information which may include a data size, a timestamp (e.g., data creation timestamp), one or more digests of the payload and the like. A data object identifier may also encode metadata validation information to ensure the integrity of information associated with a data object identifier. In various embodiments, metadata validation information may include error-detection checks such as a parity check, cyclic redundancy check (CRC), error-correction checks and the like of some or all information encoded in the data object identifier. Data object identifiers may be encoded (e.g., encrypted) in entirety or partially to encapsulate information described above. Such encoding may provide data security and transparency to implementation details. In some embodiments, data object identifiers may include information described above without encryption or otherwise obscuring the information.

For retrieval or deletion of data object stored in an archival data storage system, the data object identifier associated the data object may be validated using at least the metadata validation information. The storage location information encoded in the data object identifier may be used to locate the stored data object in a non-transient data store. In some embodiments, the identifier is provided while the data object is stored in a transient data store, although the storage location information in the data object identifier is usable to locate the stored data object in a non-transient data store. Finally, payload integrity validation information may be used to validate the integrity of the retrieved or to-be-deleted data object. Subsequently, the requested access (retrieval/deletion) may be validated based at least in part on the policy information encoded in the data object identifier. Other information which may be encoded in an identifier may also be used, such as policy information used to enforce policy on requests to perform operations (e.g., delete operations) submitted using the identifier.

In an embodiment, the identifier opaquely encodes the information so that the information is in a form that is not human readable. In some examples, for instance, the identifier comprises encrypted information so that, without access to a key usable to decrypt the identifier, the encrypted information is not accessible in human readable form or, generally, in a usable form. Other features of data object identifiers that may be used in accordance with the various embodiments are described in U.S. patent application Ser. No. 13/569,994, entitled ARCHIVAL DATA IDENTIFICATION, filed on Aug. 8, 2012, which is incorporated herein by reference for all purposes.

Figure 6:
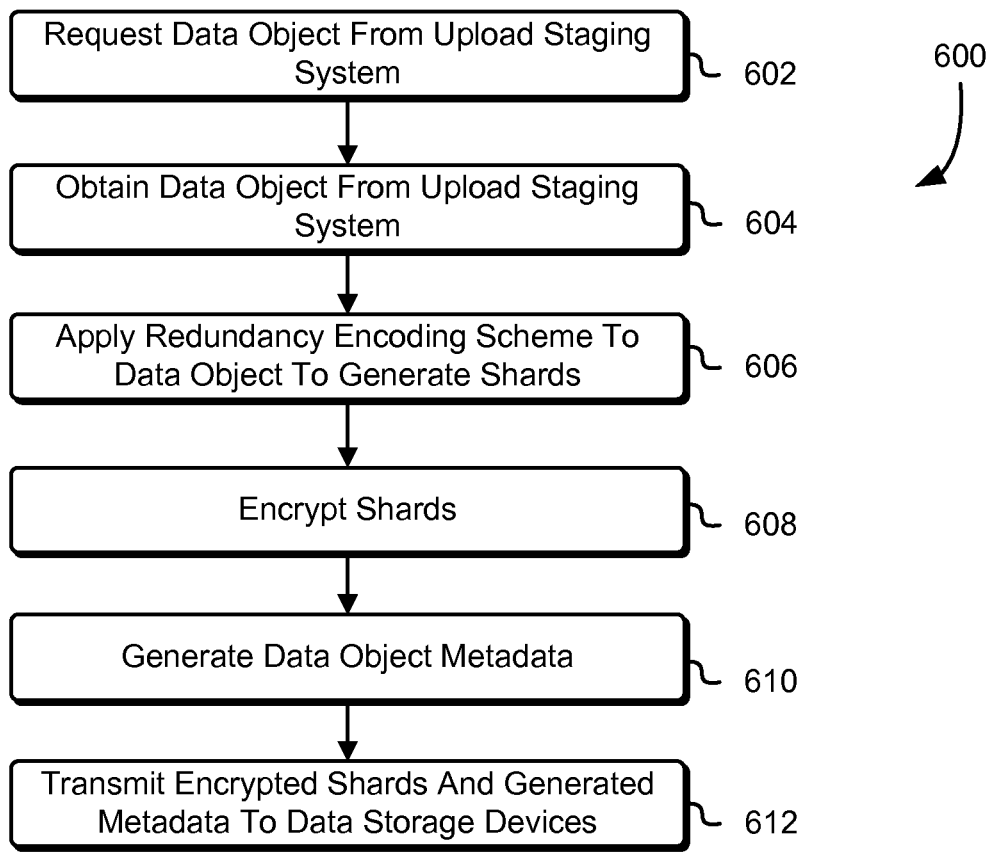
FIG. 6 shows an illustrative example of obtaining data from a staging system and migrating the data to archival storage in accordance with at least one embodiment.

As discussed, in some embodiments, a data storage service stores data objects in an asynchronous manner. That is, upon acknowledgement of a successful upload of a data object from the customer, the data storage service may perform additional operations at a later time in order to efficiently and cost-effectively store the data object. The data storage service may, for instance, process received data objects in batches in order to take advantage of parallelism and various optimizations available to the data storage service. FIG. 6 accordingly shows an illustrative example of a process 600 which may be used to store a data object that has been received from a user. The process 600 may be performed by a data storage service 300 or appropriate component thereof, such as the data encryption system 308 discussed above in connection with FIG. 3. In an embodiment, the process 600 includes requesting 602 the data object from an upload staging system, such as the upload staging system 310 discussed above in connection with FIG. 3. The upload staging system may then provide the data object in response to the request, and therefore the process 600 may include obtaining 604 the data object from the upload staging system. The upload staging system may, for instance, transmit the data object over a network of which the upload staging system and the system performing the process 600 are components of.

When the data object has been obtained 604, the process 600 may include applying 606 a redundancy encoding scheme to the data object to generate shards. A system performing the process 600, for example, may apply an erasure coding scheme to the data object to generate the shards. The shards may then be encrypted 608 using an appropriate cryptographic algorithm such as described above. Metadata for the data object may also be generated 610. An example of information included in data object metadata is discussed below in connection with FIG. 7. Once the shards have been encrypted 608 and the data object metadata has been generated 610, the encrypted shards and generated metadata may be transmitted 612 to a plurality of data storage devices which are utilized for the storage of data. The data storage devices may, for instance, be the data storage devices 312 discussed above in connection with FIG. 3.

Figure 7:
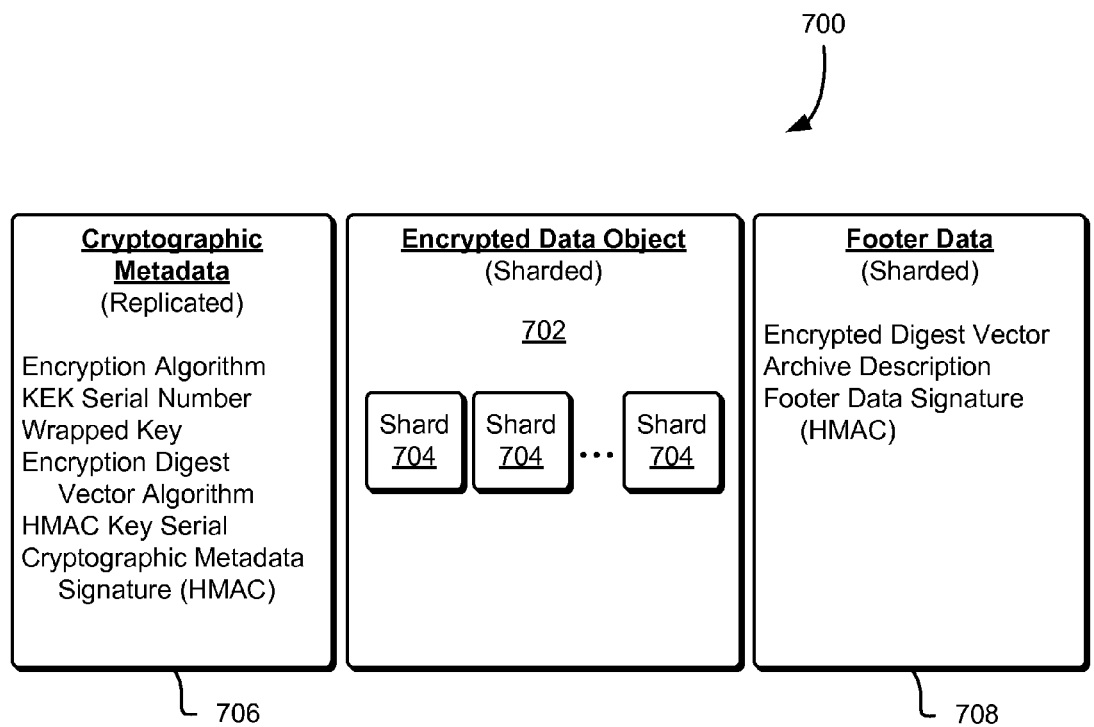
FIG. 7 shows an illustrative diagram of data and metadata for the data in accordance with at least one embodiment.

As noted, data objects stored by a data storage service may be deconstructed into shards and various metadata may be generated and stored for the data objects. FIG. 7 shows an illustrative diagram 700 of a data object 702 with metadata generated for the data object. As discussed above, the data object may be deconstructed to a plurality of shards 704, which are encrypted. Metadata for the data object may be generated to include cryptographic metadata 706 and footer metadata 708, which may be stored distinctly from one another. In an embodiment, the cryptographic metadata is data about the data object that is replicated and stored in a data storage service, such as in the data storage devices 312 and/or in one or more data storage systems configured for the storage of metadata. The cryptographic metadata 706 may include information identifying various aspects of the data object. Such information may include as illustrated in FIG. 7 the encryption algorithm (or, if appropriate, algorithms) used to encrypt the data object, a serial number for the key encrypting key used to wrap a content encryption key that was used by the encryption algorithm to encrypt the data object, a wrapped key which may the content encryption key encrypted under the key encrypting key, whose serial number is identified in the cryptographic metadata. The cryptographic metadata may also identify an encryption digest vector algorithm, which may include information identifying one or more algorithms used to generate a vector digest stored in the footer metadata 708. In addition, the cryptographic metadata may include a serial number of a key used to generate a hash-based message authentication code (HMAC) of the cryptographic metadata (i.e., of a portion of the cryptographic metadata that does not include the HMAC) and the cryptographic metadata signature, which may be the HMAC. As with all specific implementations described herein, it should be noted that variations are within the scope of the present disclosure. For example, while HMACs are used for the purpose of illustration, other types of signatures may be used instead of or in addition to HMACs.

The footer data as illustrated in FIG. 7 may also include various information about the encrypted data object, such as the encrypted digest vector, a description of the archive which may be a description provided by the customer in an appropriately configured API call to a data storage service when uploading the data object to the data storage service, and a signature for the footer metadata, which may be an HMAC. The encrypted digest vector may encode one or more nodes of a tree hash generated based at least in part on the data object. For example, in an embodiment, the encrypted digest vector encodes the leaf hashes and root hash of the data object. The digest vector may be encrypted in any suitable manner, such as using the cipher block chaining mode of the advanced encryption standard (AES-CBC) and a hash-based key derivation function to key the cipher. As illustrated in FIG. 7, the footer metadata may be sharded, such as by using an erasure coding scheme to generate shards, and the shards may be stored in the data storage devices of the data storage system. For example, the footer metadata may be stored with the shards 704 of the data object 702 in common data storage devices.

Figure 8:
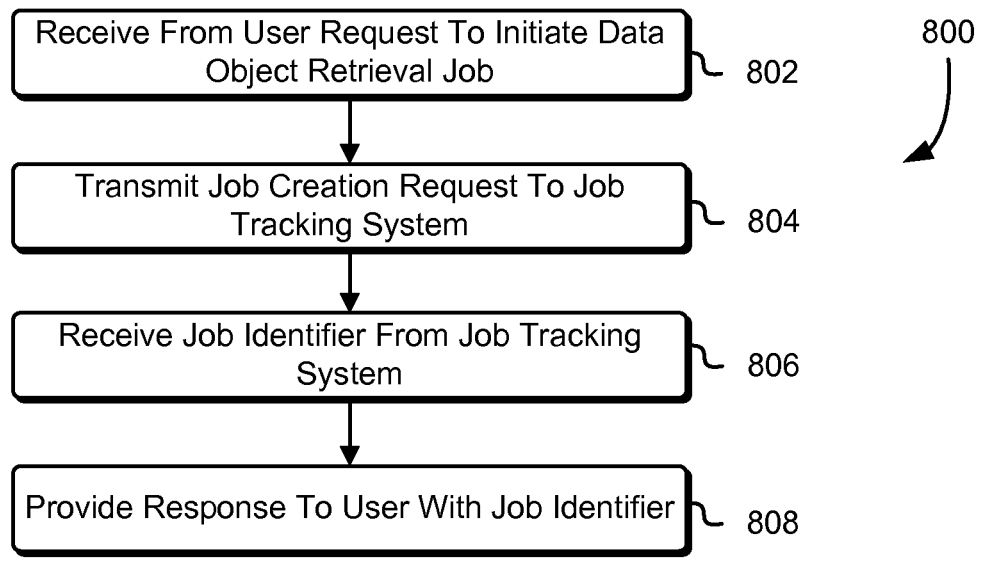
FIG. 8 shows an illustrative example of a process for initiating a job in a data storage system in accordance with at least one embodiment.

Various operations performed by a data storage service, as noted above, may be performed asynchronously. A request may be submitted to the data storage service and the data storage service may fulfill the request in an asynchronous manner. For example, requests to retrieve data objects may be batched, and data objects may be retrieved from data storage devices and provided to a download staging system in batches. When a batch containing a customer's data object has been transmitted to a download staging system, the user of the data storage service may request the data object. FIG. 8 accordingly shows an illustrative example of a process 800 for asynchronously processing requests in accordance with an embodiment. The process 800 may be performed by any suitable system, such a data storage service 300 or an appropriate component thereof such as the web interface system 302. A web server of the web interface system 302 described above in connection with FIG. 3 may, for instance, perform the process 800. In an embodiment, the process 800 includes receiving 802 from a user a request to initiate an object retrieval job. The request may come for example in the form of an appropriately figured API call to the data storage service 300. Upon receipt of the request to initiate the object retrieval job, the process 800 may include transmitting a job creation request to a job tracking system such as described above in connection with FIG. 3.

The job tracking system, as noted above, may perform various operations in connection with the tracking of jobs performed by the data storage service. One of these operations may be to initiate jobs, which may include determining an identifier for the job. The job tracking system may, for instance, provide a serial number or other identifier for the job. Accordingly, the process 800 includes receiving 806 a job identifier from the job tracking system. Once the job identifier has been received 806 from the job tracking system, a system performing the process 800 may provide 808 a response to the user with the job identifier. In this manner, the user may submit requests to a data storage system with the job identifier in order to perform various operations in connection with the job, such as checking the status of the job, canceling the job and/or downloading data retrieved as part of processing of the job.

Figure 9:
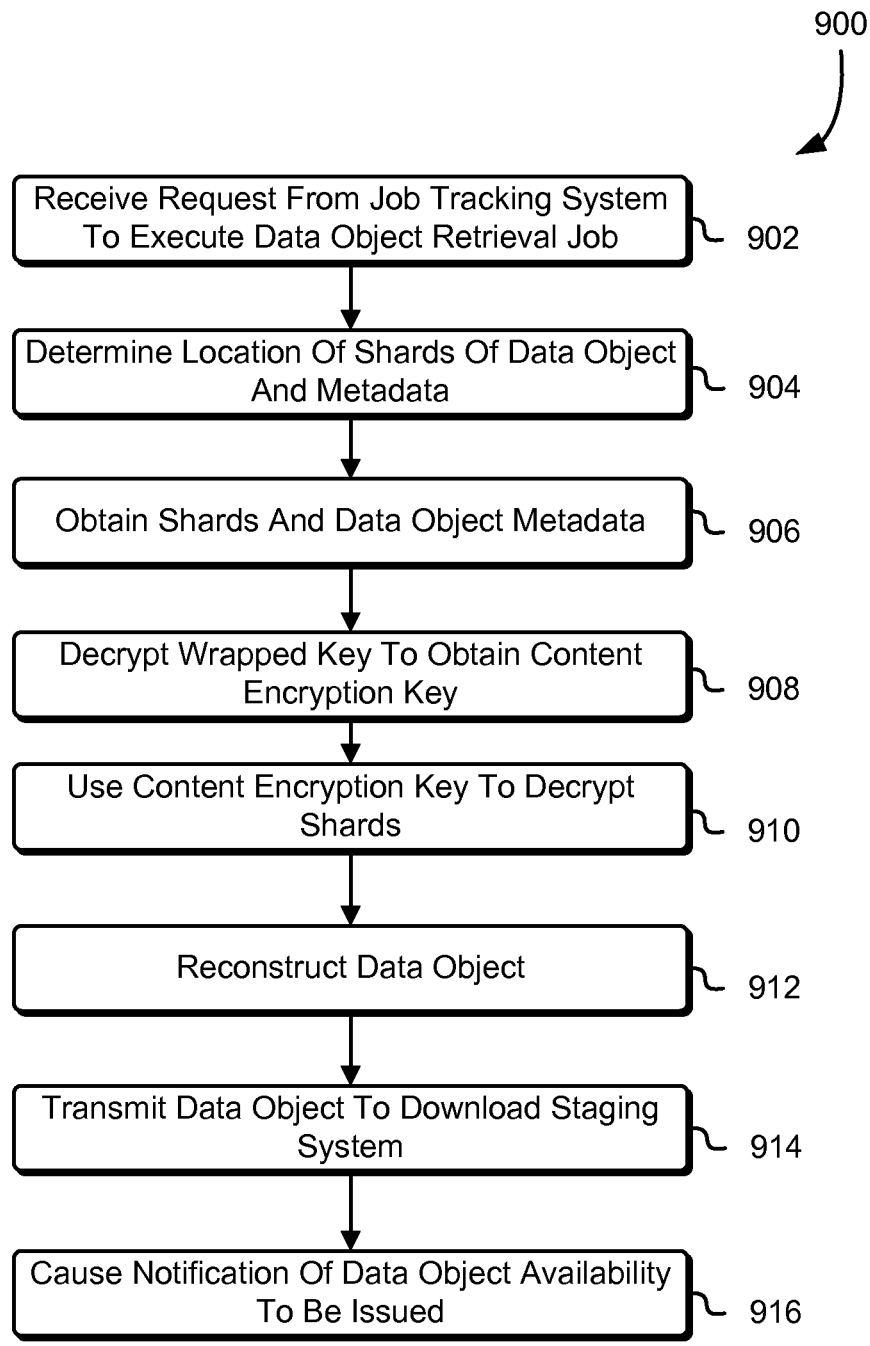
FIG. 9 shows an illustrative example of a process for processing a data retrieval job in accordance with at least one embodiment.

Once a job has been initiated by a data storage service, the data storage service may process the job. FIG. 9 accordingly shows an illustrative example of a process 900 which may be used to process a data retrieval job such as described above in connection with FIG. 8. The process 900 may be performed by any suitable system such as an appropriate component of a data storage service 300, such as the data encryption system 308 described above in connection with FIG. 3. As illustrated in FIG. 9, the process 900 includes receiving 902 a request from a job tracking system to execute a data object retrieval job. Upon receipt 902 of the request from the job tracking system, the process 900 may include determining 904 the location of shards of the data object for which the data object retrieval job is being performed. Determining the location of the shards may be performed in any suitable manner. For example, in some redundancy encoding schemes, less than all of the shards are needed to construct the data object. Accordingly, the process 900 may include determining 904 the location of enough shards to construct the data object, more than enough shards to construct the data object and/or all of the shards of the data object. Once the location of the shards of the data object has been determined 904, the process 900 may include obtaining 906 the shards and data object metadata. The determined locations of the shards, for example, may be used to retrieve the shards and metadata from the data storage devices 312.

When object metadata has been obtained, the process 900 may include decrypting 908 a wrapped key from the data object metadata to obtain the content encryption key that was used to encrypt the shards. Decrypting 908 the wrapped key may include various appropriate operations such as accessing the key encrypting key that was used to encrypt the content encryption key, thereby generating the wrapped key, and using the key encrypting key to decrypt to the wrapped key and thereby obtain the content encryption key. Further, decrypting 908 the key encrypting key may include determining the serial number of the key encrypting key from the data object metadata and using the serial number to access the corresponding key encrypting key.

Once the content encryption key has been decrypted 908 using the appropriate key encrypting key, the process 900 may include using 910 the content encryption key to decrypt the shards. Once the shards have been decrypted 910, the process 900 may include reconstructing 912 the data object. For example, the data object may be reconstructed 912 in accordance with the scheme (e.g., erasure encoding scheme) that was used to generate the shards. Once the data object has been reconstructed 912 the process 900 may include transmitting the data object to a download staging system such as described above in connection with FIG. 3. As noted above, in some embodiments, the data object is encrypted and then deconstructed into shards. In such embodiments, the process 900 may be modified to reconstruct the encrypted data object and then decrypt the data object using the content encryption key.

Once the data object has been transmitted 914 to the download staging system, the process 900 may include causing 916 a notification of data object availability to be issued. For example, referring to the environment comprising the data storage service 300 in FIG. 3, the data encryption system may notify the job tracking system 304 that the data object has been successfully transmitted to the download staging system 314. The job tracking system 304 may then post a notification to the notification system 306 that the data object is ready for retrieval. The notification system 306 may then provide a notification to one or more recipients of the data object's availability. Generally, any manner of notifying one or more users of the job's completion may be used.

As with all processes described herein, variations are considered as being within the scope of the present disclosure. For example, as noted above, data objects may be encrypted and then deconstructed into shards. In such embodiments, the process 900 may be adapted such that the encrypted data object is reconstructed using a set of shards and then the reconstructed encrypted data object can be decrypted. Other variations are also considered as being within the scope of the present disclosure.

Figure 10:
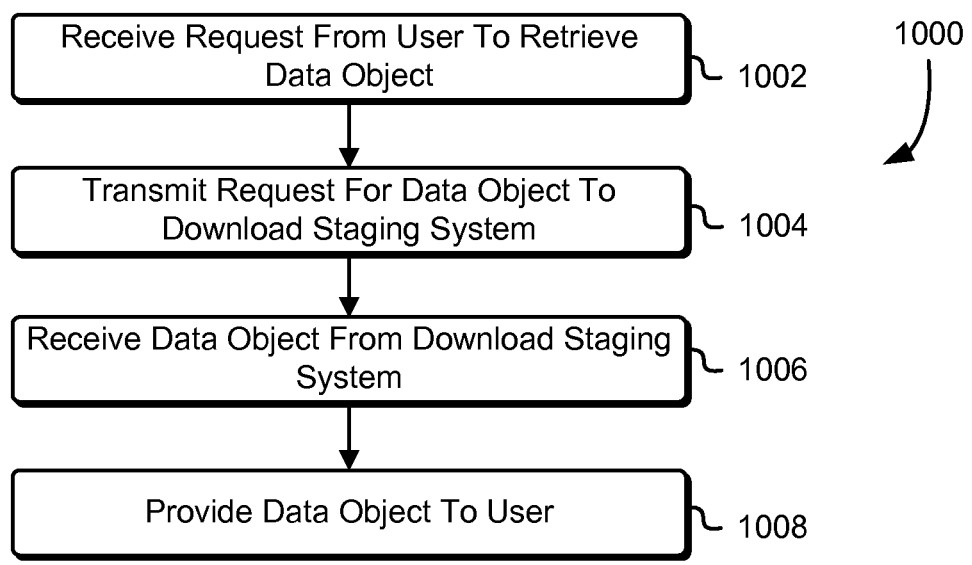
FIG. 10 shows an illustrative example of a process for providing retrieved data in accordance with at least one embodiment.

In various embodiments, once the data object is available for retrieval, a user may, through a web interface system obtain the data object. FIG. 10, for example, shows an illustrative example of a process 1000 which may be used to provide a data object that is available for retrieval. The process 1000 may be performed by any suitable component of a data storage service such as a web server of the web interface system 302 described above in connection with FIG. 3. In an embodiment, the process 1000 includes receiving 1002 a request from a user to retrieve a data object. The request may be in the form of an appropriately configured API call which may encode a job identifier for a job that was processed in order to make the data object available for retrieval. Upon receipt 1002 of the request from the user, the process 1000 may include transmitting 1004 a request for the data object to a download staging system that stores the data object for retrieval. The download staging system may respond to the transmitted 1004 request and provide the data object, such as by transmitting the data object over a network. Accordingly, the process 1000 may include receiving 1006 the data object from the download staging system and providing 1008 the data object to the user, such as by transmitting the data object over a network to the user.

Figure 11:
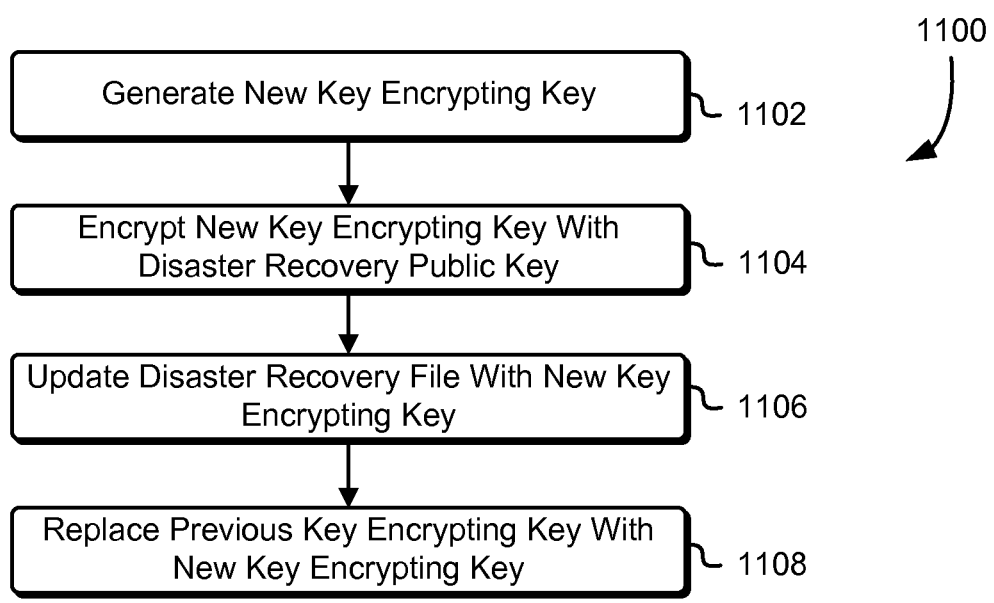
FIG. 11 shows an illustrative example of a key rotation process in accordance with at least one embodiment.

As noted above, various embodiments of the present disclosure allow for rotation of a key encrypting key for various purposes related to security enhancement. FIG. 11 accordingly shows an illustrative example of a process 1100 which may be used to rotate a key encrypting key. The process 1100 may be performed by any suitable component of a data storage system, such as the data encryption system 308 described above in connection with FIG. 3. Further, the process 1100 may be performed by a system upon detecting a need to rotate a key encrypting key, such as in response to a detected compromise of a currently used key encrypting key or in response to reaching a time according to a key rotation schedule.

As illustrated in FIG. 11, the process 1100 includes generating 1102 a new key encrypting key and may be performed in any suitable manner. For example, a new key encrypting key may be generated randomly, such as described above. The generated new key encrypting key may then be encrypted 1104 using a disaster recovery public key of a disaster recovery public private key pair. A disaster recovery file may be updated to encode the encrypted new key encrypting key and associate the new key encrypting key with a serial number for the new key encrypting key. As described in more detail below, a disaster recovery file may be a structured collection of data that enables, to those having access to corresponding private keys used to encrypt the key encrypting keys for the file, access to one or more previously used key encrypting keys. Further, as discussed below, a disaster recovery file may be redundantly stored. Accordingly, updating the disaster recovery file may include updating multiple copies of the disaster recovery file or, generally, updating the data in multiple locations.

Upon updating 1106 the disaster recovery file, the process 1100 may include replacing 1108 the previous key encrypting key with the new key encrypting key. Replacing 1108 the previous key encrypting key with the new key encrypting key may be performed in any suitable manner, such as by marking the new key encrypting key electronically as available for use in performing cryptographic operations. Generally, one or more systems that utilize the key encrypting key may be updated so that the new key encrypting key is used to perform subsequent encryption operations. It should be noted that the previous key encrypting key may remain available to enable decryption of wrapped keys encrypted under the previous key encrypting key.

FIG. 12 shows an illustrative example of a diagrammatic representation of a disaster recovery file 1200 and information that may be encoded therein. As illustrated in FIG. 12, the disaster recovery file may encode information in a structured format that associates encrypted versions of a key encrypting key with a serial number for each key encrypting key. In the illustrative example of FIG. 12 the information is arranged in a table format with each row associating a key encrypting key encrypted under a disaster recovery public key of a disaster recovery public-private key pair with a serial number for the key encrypted key that is encrypted. In this manner, should a key encrypting key become inaccessible or otherwise should circumstances require, an appropriate disaster recovery private key can be used to decrypt an appropriate encrypted key encrypting key from the disaster recovery file.

It should be noted that the disaster recovery file 1200 illustrated diagrammatically in FIG. 12 is provided for the purpose of illustration and that numerous variations are considered as being within the scope of the present disclosure. For example, additional information may be associated with the key encrypting keys. As one example, time information indicative of a time period during which the key encrypting keys were used may be included in the disaster recovery file, in order to enable more efficient searching of key encrypting keys should such searching be necessary. As another example, disaster recovery keys may be rotated, such as after being used a threshold number of times or on a rotation schedule. Information associating key encrypting keys with the context in which the key encrypting keys are specific may also be included in a disaster recovery file. For instance, a serial number of the disaster recovery public key used to encrypt the key encrypting key may be associated by the file with the key encrypting key. In this manner, an appropriate disaster recovery private key may be selected from multiple disaster recovery keys. Other variations are also considered as being within the scope of the present disclosure. For instance, multiple disaster recovery files may be used, such as a disaster recovery for each of multiple contexts and/or to have a disaster recovery file that encodes encrypted versions of subsets of a set of key encrypting keys.

Figure 13:
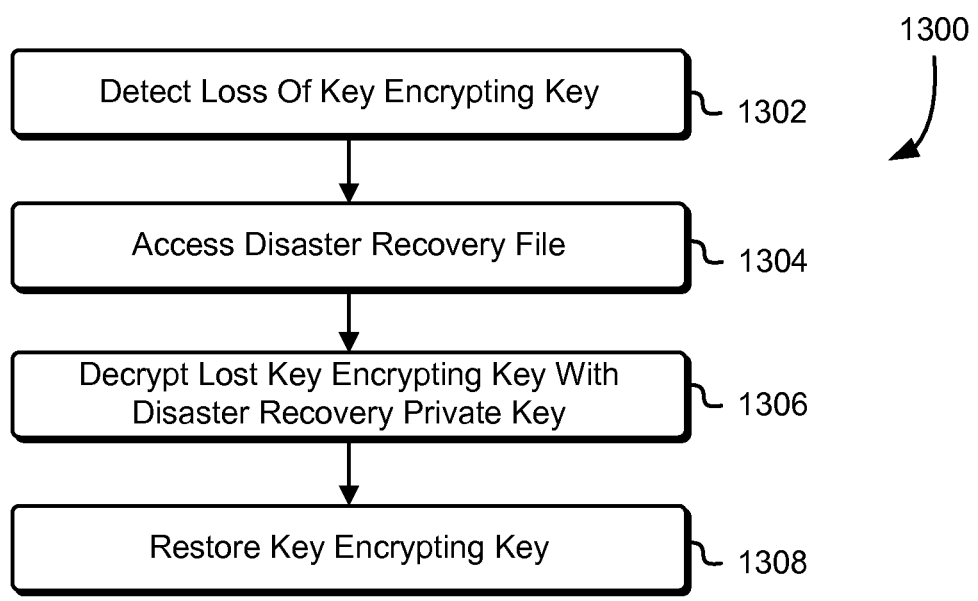
FIG. 13 shows an illustrative example of a process for restoring a key encrypting key in accordance with at least one embodiment.

As noted above, a disaster recovery may be used in instances where key encrypting keys are lost. For example, if one or more systems having access to a key encrypting key through malfunction or malfeasance destroy access to a key encrypting key, a disaster recovery file may be used to regain access to the key encrypting key. FIG. 13 accordingly shows an illustrative example of a process 1300 which may be used to recover a key encrypting key in accordance with an embodiment. The process 1300 may be performed by any suitable component of a data storage system, such as the data encryption system 308 described above in connection with FIG. 3.

In an embodiment the process 1300 includes detecting 1302, the loss of a key encrypting key. Detecting 1302, the loss of the key encrypting key, may be performed in various ways in accordance with various embodiments. For example, detection of a key encrypting key loss may be performed upon detection of a failure to perform one or more operations using the key encrypting key. As another example, one or more forensic processes may detect loss of the key encrypting key, such as in response to a detected security breach of a data storage system. Upon detection 1302 of loss of the key encrypting key, the process 1300 may include accessing 1304 a disaster recovery file. For example, in various embodiments of the present disclosure, a disaster recovery file is stored redundantly in a data storage device 312, discussed above in connection with FIG. 3.

In some embodiments, each data storage device designated for storage of data objects (e.g., by storing shards for data objects) may include a disaster recovery file, although it should be noted that not all drives of the data storage system need to store a disaster recovery file. For instance, a designated set of data storage devices may store a disaster recovery file. The set may be selected to attain sufficient redundancy. For instance, enough data storage devices may be selected to ensure a calculated likelihood (e.g., 99.99999999999%, referred to as a durability measure) that the disaster recovery file is accessible and incorrupt. In addition, the disaster recovery files may be stored using other data storage systems and/or generally data storage file may be stored in any place where it can be accessed. In some embodiments, the disaster recovery file is stored in a manner calculated to ensure a measure of durability for the disaster recovery file that is greater than a durability ensured for data objects according to a service-level agreement of the data storage system. Ensuring the durability of the disaster recovery file may include storing the disaster recovery file in multiple storage devices, on multiple server racks, in multiple data centers, in multiple geographic regions and/or in other ways that decrease any likelihood of loss of the disaster recovery file. Further, one or more disaster recovery files may be deconstructed into shards as discussed above.

Accordingly, accessing 1304 the disaster recovery file may include reading the disaster file from a data storage location in which the disaster recovery file is stored (or, if the disaster recovery is stored as distributed shards, accessing enough shards to reconstruct the disaster recovery file). Once the disaster recovery file has been accessed 1304, the process 1300 may include decrypting 1306, the lost key encrypting key, using the disaster recovery private key. It should be noted that due to the sensitive nature of the disaster recovery private key, one or more security protocols may be required to be followed in order to decrypt the lost key encrypting key using the disaster recovery private key. For example, such security protocols may require a predefined quorum of human operators present in order to utilize the disaster recovery private key. In one example, the disaster recovery private key is stored in a secure computing device accessible to one or more operators. The one or more operators may be unable to access the secure computing device without security credentials from one or more other human operators. Generally any manner of ensuring that the disaster recovery private key is used for legitimate (e.g., authorized) purposes may be used.

Once the lost key encrypting key has been decrypted 1306 using the disaster recovery private key, the process 1300 may include restoring 1308 the key encrypting key. Restoring the key encrypting key may be performed by providing the key encrypting key to one or more devices that utilize the key encrypting key, such as one or more devices comprising the data encryption system 308 described above in connection with FIG. 3.

Providing the key encrypting key to the devices may be performed in various ways. In some examples, one or more security protocols are followed in order to securely transfer the key encrypting key to one or more appropriate devices. For example, a device may utilize a public private key pair for a public key cryptographic algorithm. The public key of the public private key pair may be used to encrypt the key encrypting key. The encrypted key encrypting key may be transferred to the device, which may then use its private key from the public private key pair to decrypt the key encrypting key. As an alternative or in addition, the key encrypting key can be transmitted over a secure (e.g., SSL) channel.

Figure 14:
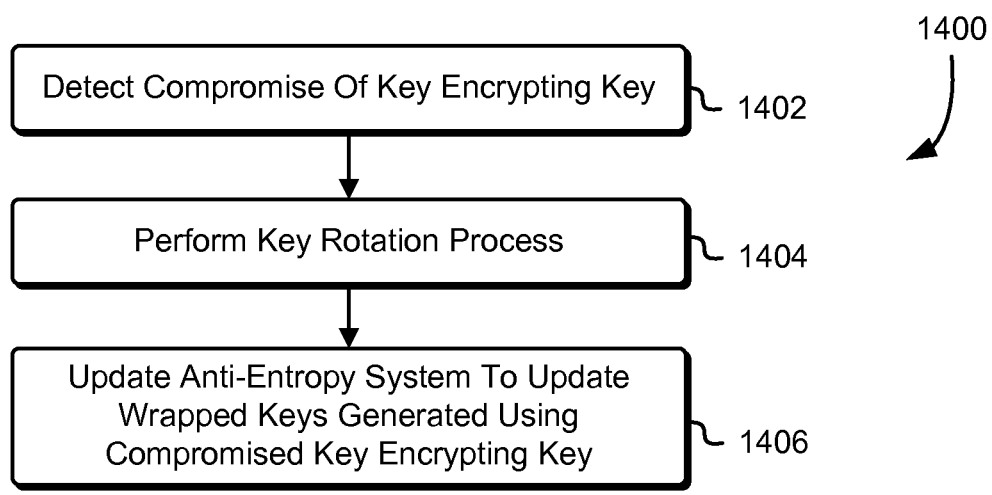
FIG. 14 shows an illustrative example of a process for updating content encryption keys in accordance with at least one embodiment.

Despite best efforts, data storage systems may experience security breaches. For example, an employee of an organization with access to certain systems of a data storage system may through error or malicious intent compromise a key encrypting key. Various techniques of the present disclosure allow a data storage system to recover from such security breaches. FIG. 14 shows an illustrative example of a process 1400 which may be used to address a security breach in accordance with various embodiments. The process 1400 may be performed by any suitable component of a data storage system, such as the data encryption system 308 described above in connection with FIG. 3. In an embodiment the process 1400 includes detecting 1402 compromise of a key encrypting key. Detecting 1402 compromise of the key encrypting key may be performed in any suitable manner, such as by receiving a report of or otherwise detecting unauthorized use of the key encrypting key.

Upon detection 1402 of compromise of the key encrypting key, a key rotation process may be performed 1404, such as described above. However, because of the key encrypting key being compromised the process 1400 may include one or more additional operations in order to prevent unauthorized use of the compromised key encrypting key to access encrypted data. In an embodiment, the process 1400 includes updating 1406, an anti-entropy system (or, generally, an anti-entropy process that is to be performed), to update wrapped keys that were generated using the compromised key encrypting key. The anti-entropy process may be updated to search for and re-wrap the content encryption key wrapped by the wrapped key. In one example, the compromised key encrypting key may be decrypted using the old key encrypting key and re-encrypted using the new key encrypting key. As another example, the wrapped key may simply be encrypted using the new key encrypting key. In this latter example, metadata may be maintained to indicate that both the compromised key encrypting key and the new key encrypting key are necessary for accessing the content encryption key from the wrapped key. For example, the wrapped key may first be decrypted with the new key encrypting key and the result may then be decrypted using the compromised key encrypting key to obtain the content encryption key.

As noted above, numerous variations are considered as being within the scope of the present disclosure. For example, in some embodiments, each shard of a data object is encrypted using a different content encryption key. As another example, iterations of the above techniques may be performed, such as by deconstructing shards to sub-shards using a redundancy encoding scheme. In this example, shards may themselves be considered to be data objects. Also, additional layers of encryption may be applied to data and, generally, other variations are considered as being within the scope of the present disclosure.

In addition to the foregoing, the techniques described herein are adaptable to variations in how data objects are processed for storage by a data storage system. For instance, intermediate operations may be performed to deconstruct a data object into shards. For example, some data objects, such as data objects exceeding some size threshold, may be deconstructed into smaller sub-objects. Data objects exceeding a certain size may be divided into smaller objects of a smaller size, where all of the smaller objects have equal size except for perhaps one of the objects (a remainder object, when the data object has a size that is not an integer multiple of the smaller size). As an illustrative example, a 31.4 megabyte (MB) data object may be divided into thirty-two sub-objects, the first thirty-one objects having a size of 1 MB and the last sub-object having a size of 0.4 MB. The first sub-object may consist of the first MB of bits of the object, the second sub-object may consist of the next MB of bits, and the like. To track the storage of data in the data storage system, the data storage system may utilize manifest files, where a manifest file is a file that enables the location of the sub-objects of a data object. As an example, an identifier for a data object may encode a location for a corresponding manifest file. The manifest file may encode locations for the sub-objects of the data object or, if the data object is particularly large, the manifest file may encode locations for other manifest files, which in turn, encode locations for other manifest files or sub-objects, and so on.

When a data storage system utilizes manifest files in this manner, the techniques described herein are applicable with slight variation. For example, the data object may be encrypted with a content encryption key and the encrypted data object can be decomposed into sub-objects, each of which can be decomposed into shards that are stored among the storage devices of the data storage system. As another example, the data object can be decomposed into sub-objects, which can then be encrypted and then decomposed into shards which are stored among the storage devices of the data storage system. In this example, each sub-object may be encrypted with the same or a different content encrypting key (or, generally, N sub-objects can be encrypted using K content encrypting keys, where N and K are integers and N is greater than or equal to K). As yet another example, a data object can be decomposed into sub-objects, which are then decomposed into shards that are then encrypted using one or more content encrypting keys (generally, if N shards can be encrypted using K content encrypting keys, where N and K are integers where N is greater than or equal to K). In each of these examples, the content encrypting key(s) may be then encrypted using a key encrypting key, such as described above. Other variations are also considered as being within the scope of the present disclosure.

As illustrated in FIG. 6, various embodiments include deconstructing a data object into shards and encrypting the shards (instead of encrypting a data object and deconstructing the encrypted data object into shards). Performing encryption and deconstruction in this order can provide numerous technical advantages. For example, as noted above, an anti-entropy or other process may be configured to include performance of a key rotation process. In some embodiments, a key rotation process may be performed for the data object itself. By encrypting shards after a data object has been deconstructed into the shards, the anti-entropy or other process may include performing the key rotation process on a shard-by-shard basis instead of collecting enough shards to reconstruct the encrypted data object, decrypting the encrypted data object, reencrypting the data object with a new key, and deconstructing the data object into shards. For instance, the process may include reencrypting shards under a new key as the shards are encountered during performance of the process without having to collect enough shards for reconstructing the data object first. In this manner, the greater flexibility allows anti-entropy and other processes may be configured to perform more efficiently and in a manner that is less disruptive to system operation.

Figure 15:
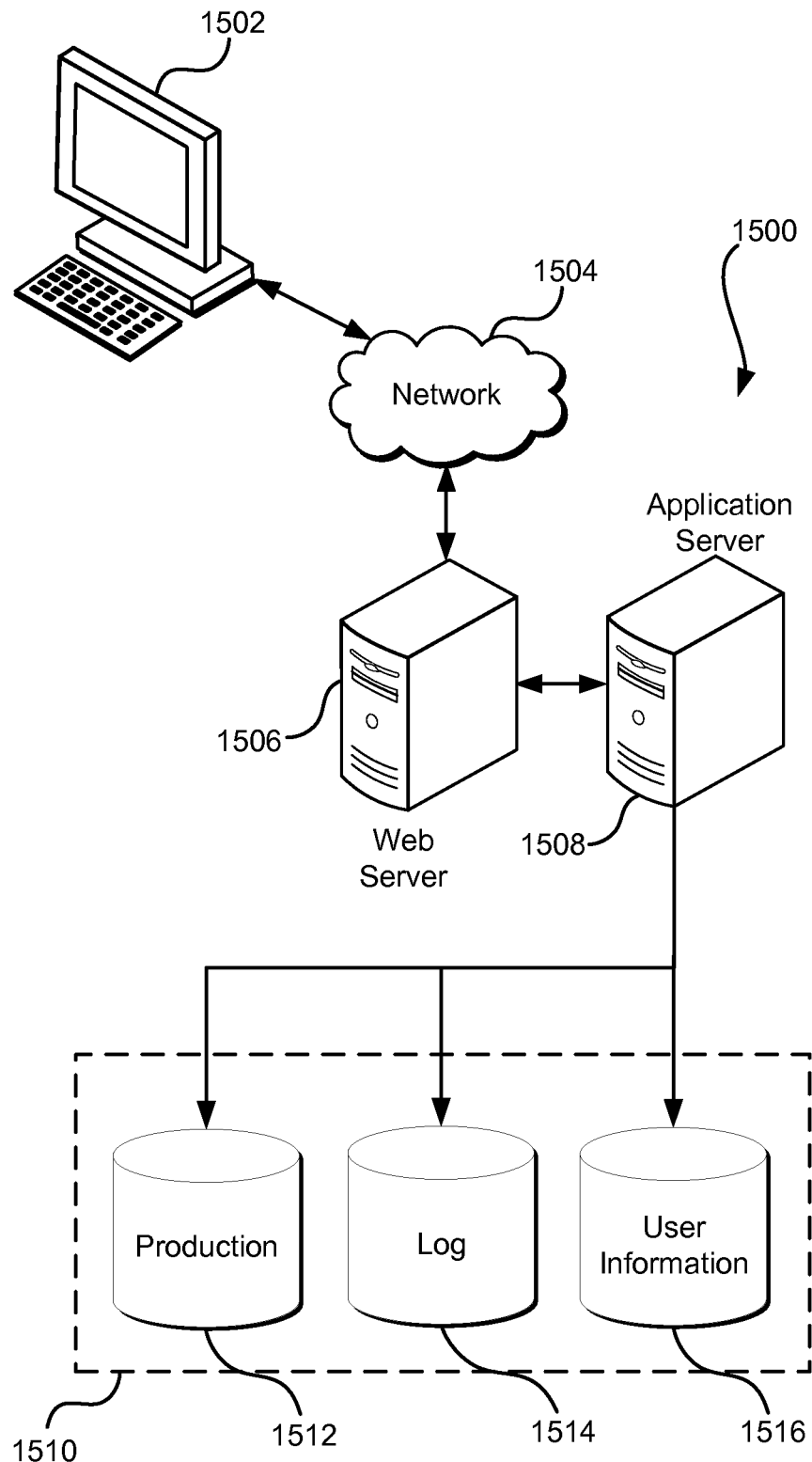
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1510 can include several separate data tables, databases or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information, such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
      receiving data objects from customers of a data storage service;
      for each data object of at least a plurality of the data objects:
         storing the data object in an intermediate data storage subsystem;
         prior to removing the data object from the intermediate data storage subsystem to a persistent data storage subsystem, providing, to a customer associated with the data object, an identifier for the data object that includes, in encrypted form, information usable to retrieve the data object after the data object is removed from the intermediate data storage subsystem;
         generating a first cryptographic key for the data object;
         encrypting the data object using the first cryptographic key;
         causing the first cryptographic key to be encrypted using a second cryptographic key; and
         redundantly storing, in the persistent data storage subsystem, the encrypted data object and the encrypted first cryptographic key using a plurality of data storage devices used by the data storage service to persistently store the received data objects, wherein redundantly storing the encrypted data object includes storing a plurality of shards such that each shard of the plurality of shards is stored in a different data storage device of the plurality of data storage devices, the plurality of shards generated by applying a redundancy encoding scheme to the data object and encrypted using the first cryptographic key after applying the redundancy encoding scheme;
      encrypting the second cryptographic key using a third cryptographic key; and
      redundantly storing the encrypted second cryptographic key among the plurality of data storage devices.

2. The computer-implemented method of claim 1, wherein:
   the method further comprises deconstructing the data object into a plurality of shards;
   encrypting the data object includes encrypting the plurality of shards; and
   redundantly storing the encrypted data object includes distributing the plurality of shards among the plurality of data storage devices.

3. The computer-implemented method of claim 1, wherein encrypting the data object and encrypting the first cryptographic key are each performed using a symmetric key cryptographic algorithm.

4. The computer-implemented method of claim 1, wherein encrypting the third key is performed using a public key cryptographic algorithm.

5. The computer-implemented method of claim 1, wherein encrypting the first cryptographic key using the second cryptographic key is performed for multiple different first cryptographic keys using the same second cryptographic key.

6. The computer-implemented method of claim 1, further comprising storing, with the data object, information that associates the first cryptographic key with an identifier for the second cryptographic key that distinguishes the second cryptographic key from one or more other second cryptographic keys.

7. The computer-implemented method of claim 1, wherein redundantly storing the encrypted second cryptographic key includes redundantly storing with the encrypted second cryptographic key one or more encrypted other second cryptographic keys.

8. A system, comprising:
   a second data store comprising a plurality of data storage devices;
   a first data store configured to store data until the data is removed for storage in the second data store; and
   a subsystem configured to:
      obtain data objects to be stored among the plurality of data storage devices; and
      for each data object of at least a plurality of the data objects:
         while the data object is in the first data store, provide an identifier that is usable to obtain the data object after the data object is removed from the first data store;
         encrypt the data object with a first cryptographic key;
         cause the first cryptographic key to be encrypted using a second cryptographic key; and
         redundantly store, in the second data store, the encrypted data object and the encrypted first cryptographic key among the plurality of data storage devices, wherein the subsystem redundantly stores the encrypted data object by at least storing a plurality of shards such that each shard of the plurality of shards is stored in a different data storage device, the plurality of shards generated by applying a redundancy encoding scheme to the data object and encrypted using the first cryptographic key after applying the redundancy encoding scheme.

9. The system of claim 8, wherein each data object of the plurality of the data objects is encrypted with a different first cryptographic key.

10. The system of claim 8, wherein the subsystem comprises a web interface system that provides asynchronous access to the data objects via web service calls that include corresponding identifiers for the data objects.

11. The system of claim 8, wherein:
encrypting the data object includes applying a redundancy encoding scheme to the encrypted data object to generate the plurality of shards.

12. The system of claim 8, wherein redundantly storing the encrypted first cryptographic key includes storing replicas of the encrypted first cryptographic key.

13. The system of claim 8, wherein the subsystem is further configured to:
obtain a new second cryptographic key; and
redundantly store, among the plurality of data storage devices, the second cryptographic key and the new second cryptographic key, each of the second cryptographic key and the new second cryptographic key encrypted under a third key.

14. A computer-implemented method, comprising:
obtaining data objects to be stored among a plurality of data storage devices of a second data store; and
for each data object of at least a plurality of the data objects:
while the data object is in a first data store configured to store data until the data is remove for storage in the second data store, providing an identifier that is usable to obtain the data object after the data object is removed from the first data store;
encrypting the data object with a first cryptographic key;
causing the first cryptographic key to be encrypted using a second cryptographic key; and
redundantly storing, in the second data store, the encrypted data object and the encrypted first cryptographic key among the plurality of data storage devices, wherein redundantly storing the encrypted data object comprises storing a plurality of shards such that each shard of the plurality of shards is stored in a different data storage device, the plurality of shards generated by applying a redundancy encoding scheme to the data object and encrypted using the first cryptographic key after applying the redundancy encoding scheme.

15. The computer-implemented method of claim 14, wherein each data object of the plurality of the data objects is encrypted with a different first cryptographic key.

16. The computer-implemented method of claim 14, further comprising providing a web interface that provides asynchronous access to the data objects via web service calls that include corresponding identifiers for the data objects.

17. The computer-implemented method of claim 14, further comprising applying a redundancy encoding scheme to the encrypted data object to generate the plurality of shards.

18. The computer-implemented method of claim 14, wherein redundantly storing the encrypted first cryptographic key includes storing replicas of the encrypted first cryptographic key.

19. The computer-implemented method of claim 14, further comprising:
obtaining a new second cryptographic key; and
redundantly storing, among the plurality of data storage devices, the second cryptographic key and the new second cryptographic key, each of the second cryptographic key and the new second cryptographic key encrypted under a third key.

20. The computer-implemented method of claim 14, further comprising:
encrypting the second cryptographic key using a third cryptographic key; and
redundantly storing the encrypted second cryptographic key using the plurality of data storage devices.

21. A non-transitory computer-readable storage medium having stored thereon instructions that, as a result of being processed by one or more processors of a computer system, cause the computer system to:
obtain data objects to be stored among a plurality of data storage devices of a second data store; and
for each data object of at least a plurality of the data objects:
while the data object is in a first data store configured to store data until the data is remove for storage in the second data store, provide an identifier that is usable to obtain the data object after the data object is removed from the first data store;
encrypt the data object with a first cryptographic key;
cause the first cryptographic key to be encrypted using a second cryptographic key; and
redundantly store, in the second data store, the encrypted data object and the encrypted first cryptographic key among the plurality of data storage devices, wherein redundantly storing the encrypted data object comprises storing a plurality of shards such that each shard of the plurality of shards is stored in a different data storage device, the plurality of shards generated by applying a redundancy encoding scheme to the data object and encrypted using the first cryptographic key after applying the redundancy encoding scheme.

22. The non-transitory computer-readable storage medium of claim 21, wherein each data object of the plurality of the data objects is encrypted with a different first cryptographic key.

23. The non-transitory computer-readable storage medium of claim 21, further storing instructions that, as a result of being executed by the one or more processors, cause the computer system to provide an interface that provides asynchronous access to the data objects via service calls that include corresponding identifiers for the data objects.

24. The non-transitory computer-readable storage medium of claim 21, further storing instructions that, as a result of being executed by the one or more processors, cause the computer system to apply a redundancy encoding scheme to the encrypted data object to generate the plurality of shards.

25. The non-transitory computer-readable storage medium of claim 21, wherein the instructions that cause the computer system to redundantly store the encrypted data object and the encrypted first cryptographic key cause the computer system to store replicas of the encrypted first cryptographic key.

26. The non-transitory computer-readable storage medium of claim 21, further storing instructions that, as a result of being executed by the one or more processors, cause the computer system to:
obtain a new second cryptographic key; and
redundantly store, among the plurality of data storage devices, the second cryptographic key and the new second cryptographic key, each of the second cryptographic key and the new second cryptographic key encrypted under a third key.

* * * * *